US008751556B2

(12) United States Patent
Song

(10) Patent No.: US 8,751,556 B2
(45) Date of Patent: Jun. 10, 2014

(54) PROCESSOR FOR LARGE GRAPH ALGORITHM COMPUTATIONS AND MATRIX OPERATIONS

(75) Inventor: William S. Song, Lexington, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 463 days.

(21) Appl. No.: 13/153,490

(22) Filed: Jun. 6, 2011

(65) Prior Publication Data

US 2011/0307685 A1    Dec. 15, 2011

Related U.S. Application Data

(60) Provisional application No. 61/353,856, filed on Jun. 11, 2010.

(51) Int. Cl.
    *G06F 17/16*    (2006.01)
(52) U.S. Cl.
    USPC .......................................................... 708/607
(58) Field of Classification Search
    None
    See application file for complete search history.

(56) References Cited

U.S. PATENT DOCUMENTS

| | | | |
|---|---|---|---|
| 5,081,573 A | | 1/1992 | Hall et al. |
| 5,878,241 A | * | 3/1999 | Wilkinson et al. ............. 712/203 |
| 5,963,745 A | * | 10/1999 | Collins et al. .................... 712/13 |
| 5,963,746 A | * | 10/1999 | Barker et al. .................... 712/20 |
| 6,891,447 B2 | | 5/2005 | Song |
| 2005/0033944 A1 | | 2/2005 | Wadleigh |
| 2005/0229091 A1 | | 10/2005 | Narayanan et al. |
| 2007/0198621 A1 | | 8/2007 | Lumsdaine et al. |
| 2009/0006072 A1 | | 1/2009 | Bliss et al. |
| 2009/0271433 A1 | | 10/2009 | Perronnin et al. |
| 2010/0235674 A1 | | 9/2010 | Song |
| 2011/0307685 A1 | * | 12/2011 | Song ................................ 712/16 |

OTHER PUBLICATIONS

International Search Report and Written Opinion in counterpart PCT application No. PCT/US2011/039207, dated Feb. 9, 2012; 9 pages.
International Preliminary Report on Patentability in counterpart PCT application No. PCT/US2011/039207, dated Dec. 14, 2012; 5 pages.
Kendrick, Ryan et al.; "Sparse Matrix Multiplication on a Field-Programmable Gate Array"; Worcester Polytechnic Institute, Oct. 11, 2007; 154 pgs.

(Continued)

*Primary Examiner* — David H Malzahn
(74) *Attorney, Agent, or Firm* — Schmeiser, Olsen & Watts LLP; Michael Rodriguez

(57) ABSTRACT

A multiprocessor system and method for performing matrix operations includes multiple processors cooperatively performing a sparse matrix operation. Distributed among the processors are non-zero matrix elements of first and second sparse matrices. Mapped across the processors are the matrix elements of a results matrix. Each processor receives, from the other processors, non-zero matrix elements of the first matrix that had been distributed to those other processors and generates partial results based on the received non-zero matrix elements of the first matrix and on the non-zero matrix elements of the second matrix distributed to that processor. Each processor receives those partial results generated by other processors and associated with the matrix elements of the results matrix mapped to that processor. Each processor generates a final value for each matrix element of the results matrix mapped to that processor based on the partial results generated by that processor and on the partial results received from the other processors associated with that matrix element of the results matrix.

37 Claims, 14 Drawing Sheets

(56) References Cited

OTHER PUBLICATIONS

Robertson, Christopher; "Sparse Parallel Matrix Multiplication"; Master's Project, Oct. 25, 2005; 79 pgs.

Song, U.S. Appl. No. 12/703,938, filed Feb. 11, 2010, "Multiprocessor Communication Networks", 53 pgs.

Gilbert, John R. et al.; "High Performance Graph Algorithms from Parallel Sparse Matrices"; Applied Parallel Computing, State of the Art in Scientific Computing, Lecture Notes in Computer Science, vol. 4699, 2007, pp. 260-269, Book Subtitle: 8th International, PARA 2006, Umea, Sweden, Jun. 18-21, 2006.

* cited by examiner

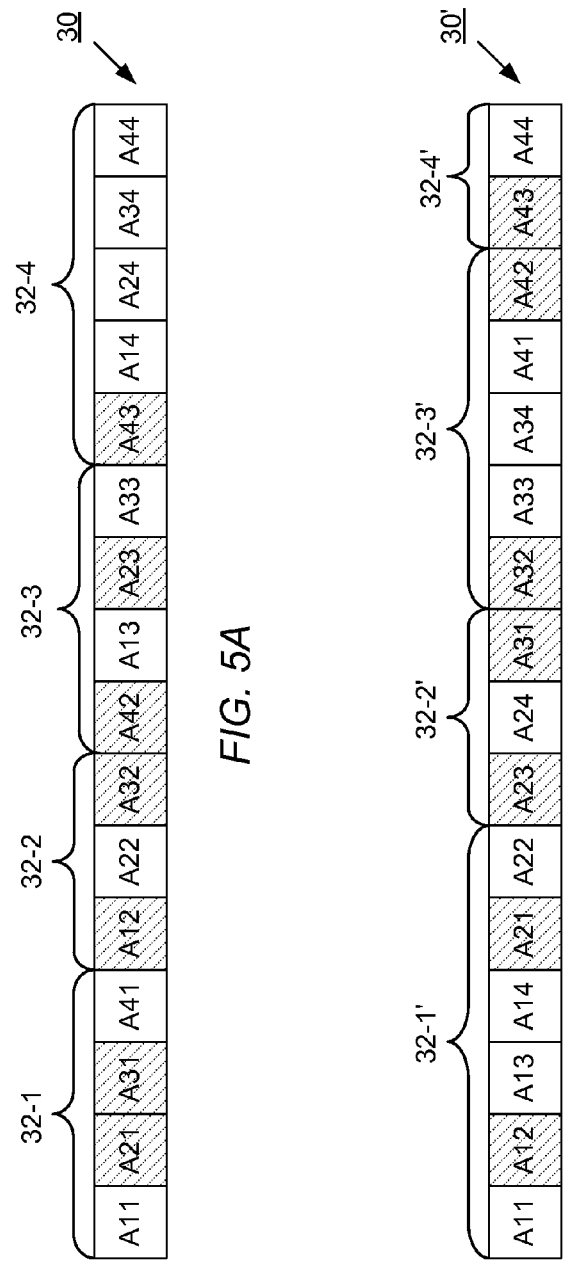

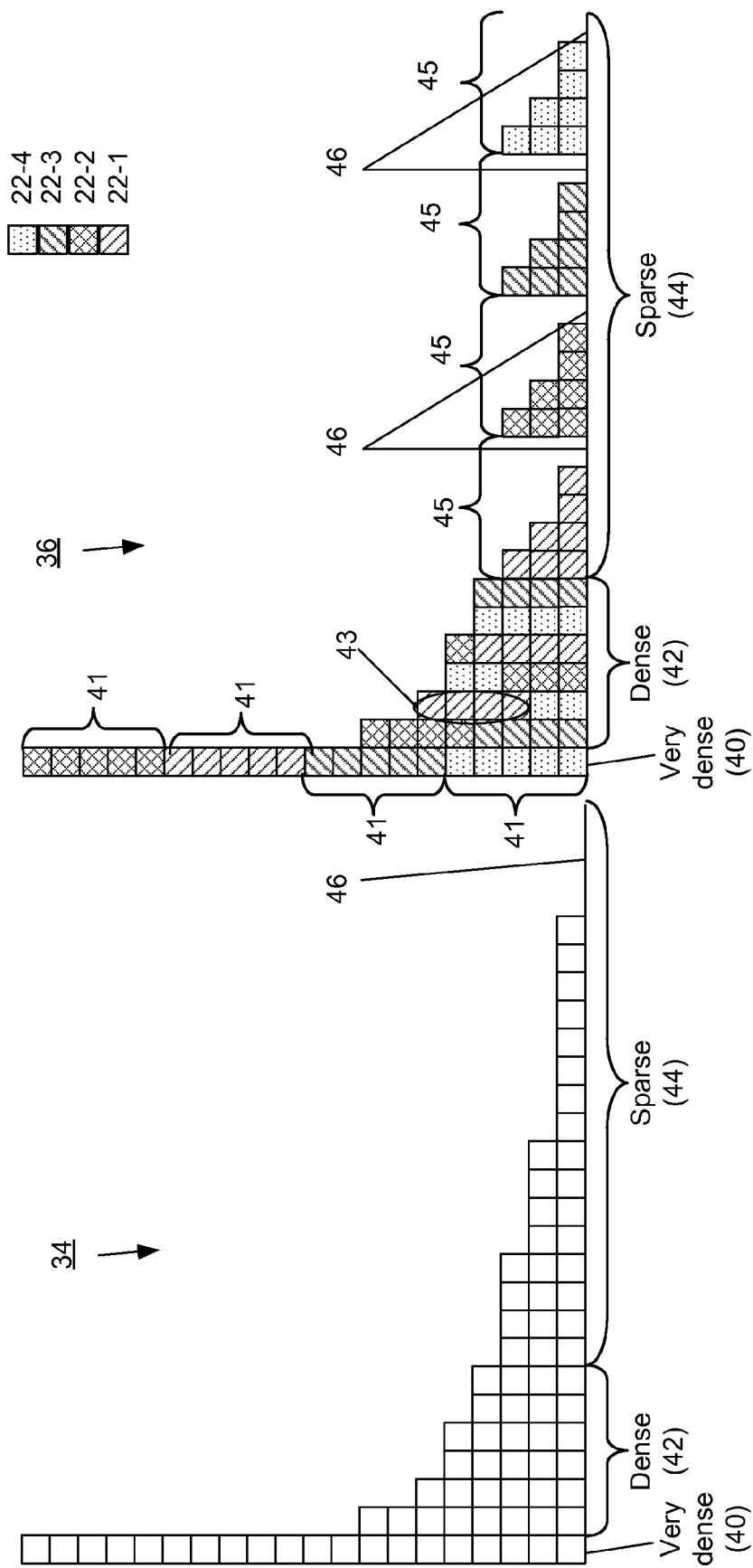

22

PROCESSOR FOR LARGE GRAPH ALGORITHM COMPUTATIONS AND MATRIX OPERATIONS

GOVERNMENT RIGHTS IN THE INVENTION

This invention was made with government support under grant number FA8721-05-C-0002 awarded by the Air Force. The government has certain rights in this invention.

RELATED APPLICATION

This application claims priority to and the benefit of U.S. provisional application No. 61/353,856, filed on Jun. 11, 2010, titled "High-performance Processor for Large Graph Algorithm and Sparse Matrix Computations," the entirety of which provisional application is incorporated by reference herein.

FIELD OF THE INVENTION

The invention relates generally to processor systems. More specifically, the invention relates to processors and multiprocessor systems particularly adapted to perform large graph algorithm computations and sparse matrix operations.

BACKGROUND

Many commercial and government applications use graph algorithms to perform various tasks. Examples of such tasks include finding a shortest or fastest path on a map, routing robots, analyzing DNA, scheduling activities, processing transactions, allocating resources, analyzing social networks, and optimizing networks for communication, transportation, water supply, electricity, and traffic. Some of the graph algorithm applications involve analyzing large databases. Examples of information in these large databases include, but are not limited to, consumer purchasing patterns, financial transactions, social networking patterns, financial market data, and internet data.

In the execution of these large database applications, computation hardware often has difficulty achieving the throughput requirements of the graph algorithm computations. For example, most conventional processors employ cache-based memory systems in order to take advantage of the highly localized access patterns involved in many conventional processing tasks. However, memory access patterns for graph processing are often random in practice and cache miss rates tend to be high, significantly degrading performance. In addition, graph algorithms require many operations involving indices of vertices and edges, and the complexity associated with these index-related operations can significantly degrade processor performance. Consequently, a typical large graph algorithm can run hundreds or a thousand times slower on conventional processors than conventional processing.

To increase computational throughput, some manufacturers have added more cores on the processor die of conventional processors. This increase in processing capacity can translate to an increase in the graph algorithm throughput when processing throughput is the predominant limitation on performance. However, when memory access bandwidth is the limiting factor on processing throughput, having many cores on a single semiconductor die does not necessarily translate to significant acceleration. Because current commercial multi-core processors tend to rely on cache-based memory architecture, graph algorithms with random memory access patterns still tend to run slowly on these multi-core processors. In addition, the power efficiency and die area efficiency of conventional processors are not much improved by using multi-core processors because the same number of total processor operations are required to perform a given graph algorithm computation.

Another technique for increasing throughput for many conventional processing tasks entails networking multiple processors together. A communication network interconnects the multiple processors so that different processors can handle different portions of the computations. However, the individual processors of these multiprocessor networks tend to be cache-based, and encounter the previously described limitations.

Increasingly, industry is producing individual processors with multiple processor cores. For many scientific computing applications, multiprocessor communication networks with a large number of these multi-core processors produce significant acceleration when compared to a single processor, provided the multiprocessor communication network can keep pace with the computations. Because conventional computing, including scientific computing, requires relatively low communication bandwidth in comparison to the computational throughput of graph processing, conventional multiprocessor networks can provide significant acceleration for conventional computing. However, graph algorithms tend to require much higher communication bandwidth compared to the computational throughput of conventional computing. Hence, large graph algorithms often run inefficiently in conventional multiprocessor networks that have limited communication bandwidths. The acceleration achieved by having multiple processors typically levels off after only a small number of processors. This leveling off occurs because the computing patterns for graph algorithms require much more communication between processors than conventional highly localized processing.

SUMMARY

In one aspect, the invention features a method of performing a matrix operation that operates with first and second sparse matrices to produce a sparse results matrix. The method comprises distributing non-zero matrix elements of the first sparse matrix and non-zero matrix elements of the second sparse matrix among a plurality of node processors. Matrix elements of the sparse results matrix are mapped across the plurality of node processors. Each node processor receives, from the other node processors, one or more non-zero matrix elements of the first sparse matrix that had been distributed to those other node processors. Each node processor generates, in accordance with the matrix operation, partial results based on the non-zero matrix elements of the first sparse matrix received by that node processor from the other node processors and on the non-zero matrix elements of the second sparse matrix distributed to that node processor. Each node processor receives from the other node processors those partial results generated by those other node processors and associated with the matrix elements of the sparse results matrix mapped to that node processor. Each node processor generates a final value for each matrix element of the sparse results matrix mapped to that node processor based on the partial results generated by that node processor and on the partial results received from the other node processors associated with that matrix element of the sparse results matrix.

In another aspect, the invention features a multiprocessor system for performing sparse matrix operations, the multiprocessor system comprising a communications network and a plurality of node processors in communication with the communications network. The plurality of node processors operates concurrently to perform a matrix operation that operates with first and second sparse matrices to produce a sparse results matrix. Each node processor comprises memory to store the non-zero matrix elements of the first sparse matrix and the non-zero matrix elements of the second sparse matrix distributed to that node processor and to store matrix elements of the sparse results matrix mapped to that node processor. Each node processor further includes means for receiving, over the communications network from the other node processors, one or more non-zero matrix elements of the first sparse matrix that had been distributed to those other node processors, an arithmetic logic unit to generate, in accordance with the matrix operation, partial results based on the non-zero matrix elements of the first sparse matrix received by that node processor from the other node processors and on the non-zero matrix elements of the second matrix distributed to that node processor. The receiving means receives, over the communications network from the other node processors, those partial results generated by the other node processors and associated with the matrix elements of the sparse results matrix mapped to that node processor. The arithmetic logic unit generates a final value for each matrix element of the sparse results matrix mapped to that node processor based on the partial results generated by that node processor and on the partial results received from the other node processors associated with that matrix element of the sparse results matrix.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 5A is a diagram illustrating an example of a column-based mapping technique for distributing non-zero matrix elements of a sparse matrix across the plurality of node processors.

FIG. 5B is a diagram illustrating an example of a row-based mapping technique for distributing non-zero matrix elements of a sparse matrix across the plurality of node processors.

FIG. 6A and FIG. 6B are diagrams illustrating another example of a column-based mapping technique for distributing non-zero matrix elements of a sparse matrix across the plurality of node processors.

DETAILED DESCRIPTION

Figure 1:
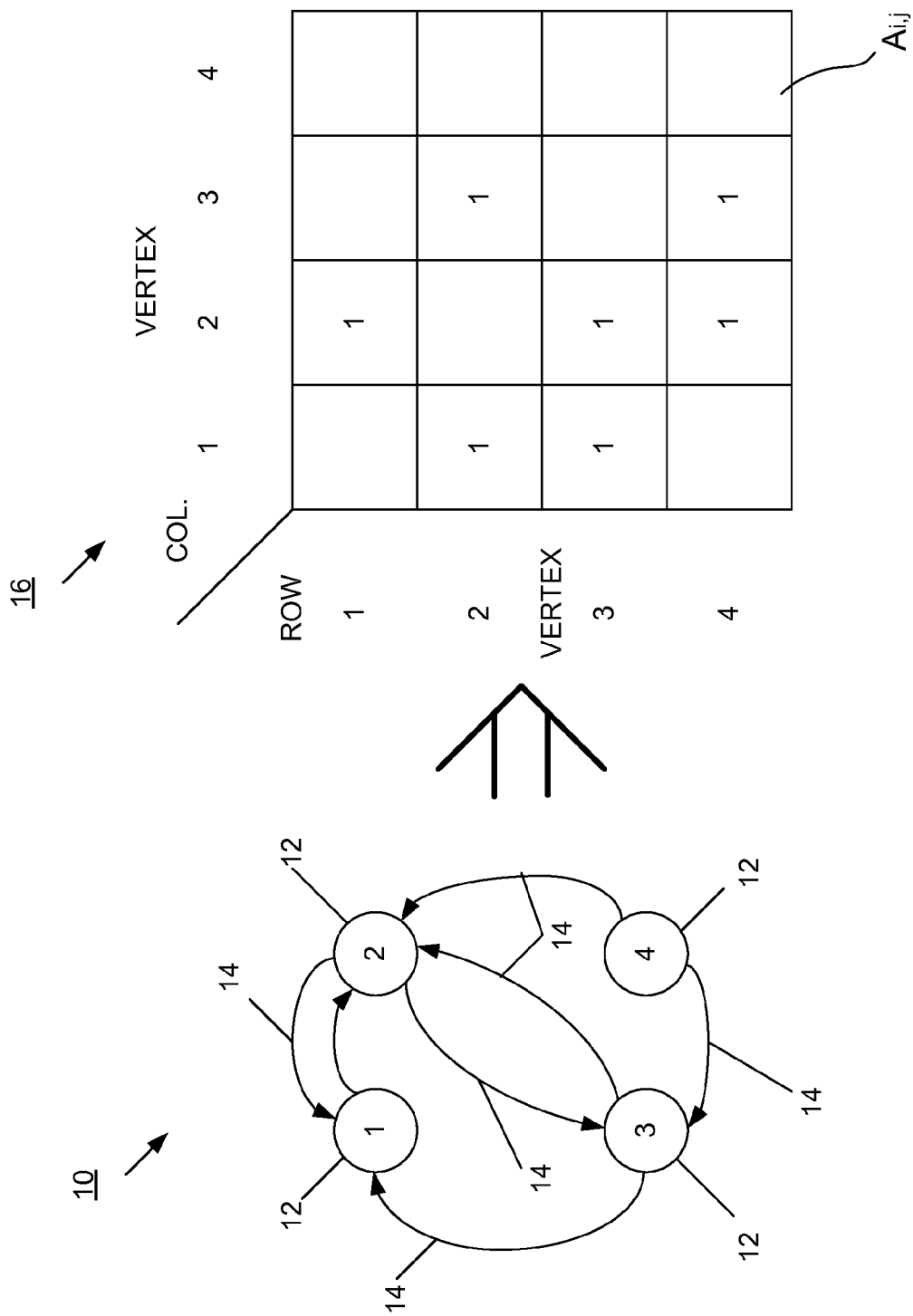
FIG. 1 is a diagram illustrating an example sparse matrix representation of a graph.

Multiprocessor systems and node processors described herein are adapted to perform sparse matrix operations, particularly sparse matrix-matrix multiplication, which tends to dominate large graph algorithm computations. Large graph algorithms have a variety of applications, including the analysis of large databases such as consumer purchasing patterns, financial transactions, social networking patterns, web-based links, financial market data, corporate business decision-making analysis, and World Wide Web databases. Most graph algorithms can be represented in sparse matrix format. In general, sparse matrices are matrices predominantly populated with zero values; that is, in a sparse matrix, the non-zero matrix elements are in the minority. Notwithstanding, large sparse matrices can contain many non-zero matrix elements, and storing large sparse matrices can require a sizable amount of memory, usually more than the amount available at a single processor. In addition, operations involving large sparse matrices can require a large amount of computational throughput.

To be particularly suited for performing sparse matrix operations in general and for sparse matrix-matrix multiplication in particular, one embodiment of architecture for a multiprocessor system described herein includes a plurality of the node processors in communication over a high-bandwidth communication network. A global control processor orchestrates execution of the sparse matrix algorithms, which the control processor distributes across these node processors. Having multiple node processors operating in parallel reduces the memory and computational throughput load borne by each node processor individually. Advantageously, execution of sparse matrix algorithms is particularly suited for parallel operation, which helps software developers to visualize and write software code that executes in parallel across the multiple node processors. The communication network of this multiprocessor system can be particularly adapted to communicate small data messages among the node processors in order to achieve a higher throughput capacity than can a conventional processor network. Consequently, the communication of messages among the node processors does not significantly slow the overall execution of the sparse matrix algorithm. A specialized communication module (embodied in each node processor) performs communication overhead operations, such as message assembly, error correction coding, message routing, and message reception.

To be particularly suited for performing matrix operations in general and sparse matrix multiplication in particular, one embodiment of architecture of a node processor described herein relies on a plurality of separate specialized accelerator module circuits specifically optimized for performing certain matrix-related tasks. These accelerator module circuits have specialized functions, such as providing a memory interface, performing computations, handling communications, and other specialized tasks, such as sorting. Such processing functions contribute to a majority of sparse matrix operations. In general, the design of each accelerator module circuit is to achieve throughput, to keep pace with the fastest data rate possible, which, preferably, is to process one matrix element or one partial product per single clock cycle, and thereby not to become a bottleneck in the overall throughput. Hardware computations occur in parallel and in pipeline fashion within each accelerator module circuit and across accelerator module circuits. Using multiple parallel versions of a given accelerator module circuit can achieve additional acceleration, enabling a node processor to process multiple matrix elements per clock cycle. Preferably, although not necessarily, the memory architecture of the node processor is cache-less, because cache miss rates are usually high in sparse matrix operations of graph algorithm computations.

In brief overview, during a matrix operation that operates with first and second sparse matrices to produce a sparse results matrix, the multiprocessor system distributes the non-zero matrix elements of the first and second sparse matrices among the node processors. In addition, the multiprocessor system maps the matrix elements of the sparse results matrix across the node processors. During one phase of the matrix operation, each node processor may exchange some of its stored non-zero matrix elements of the first sparse matrix with other node processors (for some matrix-element level operations, for example, a dot-add or dot-multiply operation, a redistribution of non-zero matrix elements may not be necessary because each node processor may already have the pertinent non-zero-elements from the initial mapping; that is, the mapping of the first and second sparse matrices are the same). Each node processor then generates partial results (e.g., a partial product) based on any received (i.e., redistributed) non-zero matrix elements and on the non-zero matrix elements of the second matrix initially distributed to that node processor. During a subsequent phase of the matrix operation, each node processor may receive those partial results generated by the other node processors and associated with the matrix elements of the results sparse matrix mapped to that node processor (again, a redistribution of partial results may not be necessary when the mapping of the second sparse matrix and the sparse results matrix are the same). Each node processor then generates a final value for each matrix element of the sparse results matrix mapped to that node processor based on the partial results generated by that node processor and on any partial results received (i.e., redistributed) from the other node processors associated with that matrix element of the sparse results matrix.

FIG. 1 shows an example implementation of a graph 10 represented in sparse matrix format. The graph 10 has vertices 12 (labeled 1, 2, 3, 4) and edges 14. The graph 10 can be directed or undirected graphs. In undirected graphs, the edges are bidirectional. In this example, each edge 14 is unidirectional, starting at a source vertex and ending at a destination vertex; accordingly, in this example, the graph 10 is a directed graph.

Sparse matrix 16 (i.e., the adjacency matrix) represents the directed graph 10. Each row of the sparse matrix 16 corresponds to a different one of the source vertices 12 and each column corresponds to a different one of the destination vertices 12. The sparse matrix 16 has a matrix element at each intersection of a row with a column; according to a notation used herein, the matrix element $A_{i,j}$ represents the directed edge from the source vertex i to the destination vertex j. In this example, a '1' appears in matrix element $A_{i,j}$ to indicate that the graph 10 has an edge from vertex i and vertex j. A matrix element $A_{i,j}$ without any value indicates that no edge exists in the graph from vertex i to vertex j; that is, the sparse matrix 16 has no entry for this particular matrix element $A_{i,j}$. Sparse matrices can also be used represent undirected graphs. In an undirected graph, both matrix elements $A_{i,j}$ and $A_{j,i}$ are set to 1 when an edge exists between vertices i and j.

A matrix element can be associated specifically with other information including, but not limited to, a data item identifier, a subsequence identifier, one or more flags, indices, and pointers to documents or records. When a given matrix element is being processed (e.g., sorted), its value and associated information, or a pointer to its value and associated information, moves to and from various memory locations and array registers. An array register or simply register, as used herein, is a memory circuit capable of storing one or more bits or words of data.

After the conversion of a graph into sparse matrix format, a processor can use sparse matrix algebraic operations to compute the graph algorithms. These algebraic operations include matrix multiplication, matrix element-level addition, matrix element-level subtraction, matrix element-level multiplication, and matrix element-level division. For algebraic operations involving three matrices A, B, and C, matrix multiplication (C=A*B) can be expressed as $C_{i,j}=\Sigma^n_{k=1} A_{1,k} * B_{k,j}$; matrix element-level addition (C=A+B) as $C_{i,j}=A_{i,j}+B_{i,j}$, matrix element-level subtraction (C=A−B) as $C_{i,j}=A_{i,j}-B_{i,j}$, matrix element-level multiplication (C=A.*B) as $C_{i,j}=A_{i,j}*B_{i,j}$, and matrix element-level division (C=A./B) as $C_{i,j}=A_{i,j}/B_{i,j}$.

In order to implement graph algorithms, the individual matrix element-level operator within these matrix operations may need to be replaced with other operators such as maximum (MAX), minimum (MIN), AND, OR, XOR, NAND, or many other types of logical or Boolean operations. For example, the matrix element-level addition and multiplication operators in matrix operations can be replaced with the minimum operator and the maximum operator. Other matrix operations can also be used, such as summing or sorting columns or rows. In addition, sparse vector operations can also be used and be represented as a special case of sparse matrix. For representing a sparse matrix of dimensionality greater than 2, multiple matrices can be used to implement additional dimensions.

An advantage to representing a graph algorithm in a sparse matrix format is that the representation permits a simple "instruction set" for graph computations, comprised of the aforementioned matrix-element operators. Advantageously, the design of a multiprocessor system that performs simple sparse matrix operations can be easier than optimizing the processor architecture for performing graph computations with conventional instructions.

Figure 2:
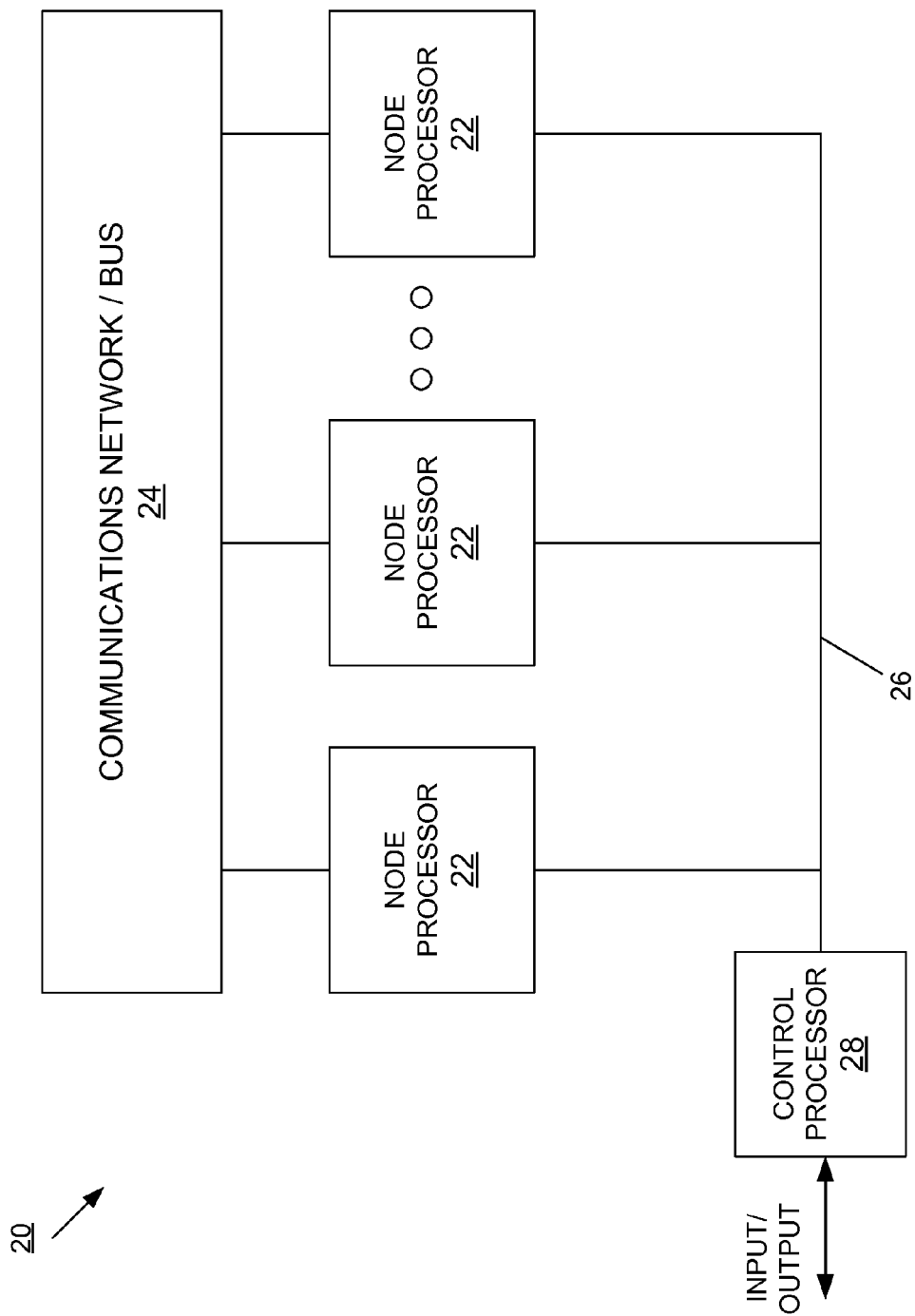
FIG. 2 is a block diagram of an embodiment of a multiprocessor system that can perform large graph computations involving sparse matrix operations, particularly sparse matrix multiplication, as described herein.

FIG. 2 shows an embodiment of a multiprocessor system 20 particularly adapted to perform large graph algorithms and matrix operations. The multiprocessor system 20 includes an array of matrix processors 22, referred to herein as node processors, a communication network or bus 24, a control bus 26, and a control processor 28. Each node processor 22 is in communication with the communication network 24. The control processor 28 is in communication with each of the node processors 22 over the control bus 26 (or through a device or system that performs an equivalent function of a control bus). The multiprocessor system 20 can be embodied within a variety of computing devices, examples of which include, but are not limited to, a server computer, a rack or blade server, a personal computer (PC), a Macintosh computer, a workstation, and a laptop computer.

The node processors 22 are the functional units that perform matrix operations. Implementation of each node processor 22 can be with hardware logic, software logic, or a combination thereof. The node processor 22 can be embodied on an integrated circuit chip or chipset, such as an FPGA (Field-programmable gate array) or an ASIC (Application-Specific Integrated Circuit).

The communication network 24 can be implemented as one of a variety of network types including, but not limited to, 2-D mesh, 3-D mesh, 2-D toroid, 3-D toroid, tree, fat tree, hypercube, omega, and a conventional bus. In general, the communication network 24 is adapted for high-bandwidth, low power consuming communication of small messages. A typical message issued by a node processor 22 contains one matrix element or one partial product. In one embodiment, the message consists of a matrix-element data value, a row index, a column index, an address of a destination node processor, and, optionally, some bits for error detection and correction. (The row and column indices identify the location of the matrix element within the given matrix.) To buffer communication data, links of the communication network 24 can use input FIFOs (First-in, First-out) and/or output FIFOs or other buffers.

Although any communication network that can efficiently route small messages can be used, preferably the communication network 24 is a packet-switching network, which is particularly effective at routing small messages. If, rather, the embodiment of communication network routes large messages, such as is done in conventional communication networks, the communication network preferably collects a large number of messages going to each particular destination node, and then sends the collection of messages to that destination node in a fewer number of transmissions. In addition, randomizing the destination addresses of those packets as the packets are submitted to the communication network may achieve high utilization of network bandwidth and efficient communication, as described, for example, in U.S. patent application Ser. No. 12/703,938, filed Feb. 11, 2010, the entirety of which patent application is incorporated by reference herein. The use of three-dimensional communication technologies may also enhance the communication bandwidth, for example, as described in U.S. Pat. No. 6,891,447, issued May 10, 2005, the entirety of which is incorporated by reference herein.

The control bus 26 is the means by which the control processor 28 communicates data, software programs, and controls (commands) to and from the node processors 22. The control bus 26 can be implemented using any proprietary or conventional bus architecture and protocols.

The control processor 28 can have memory and/or non-volatile storage, such as disks, to store the data of a large sparse matrix before and after processing. The node processors 22 can also have such storage options, either in addition to or instead of the control processor 28. Additionally, the control processor 28 has external I/O (input/output) operations.

Figure 3:
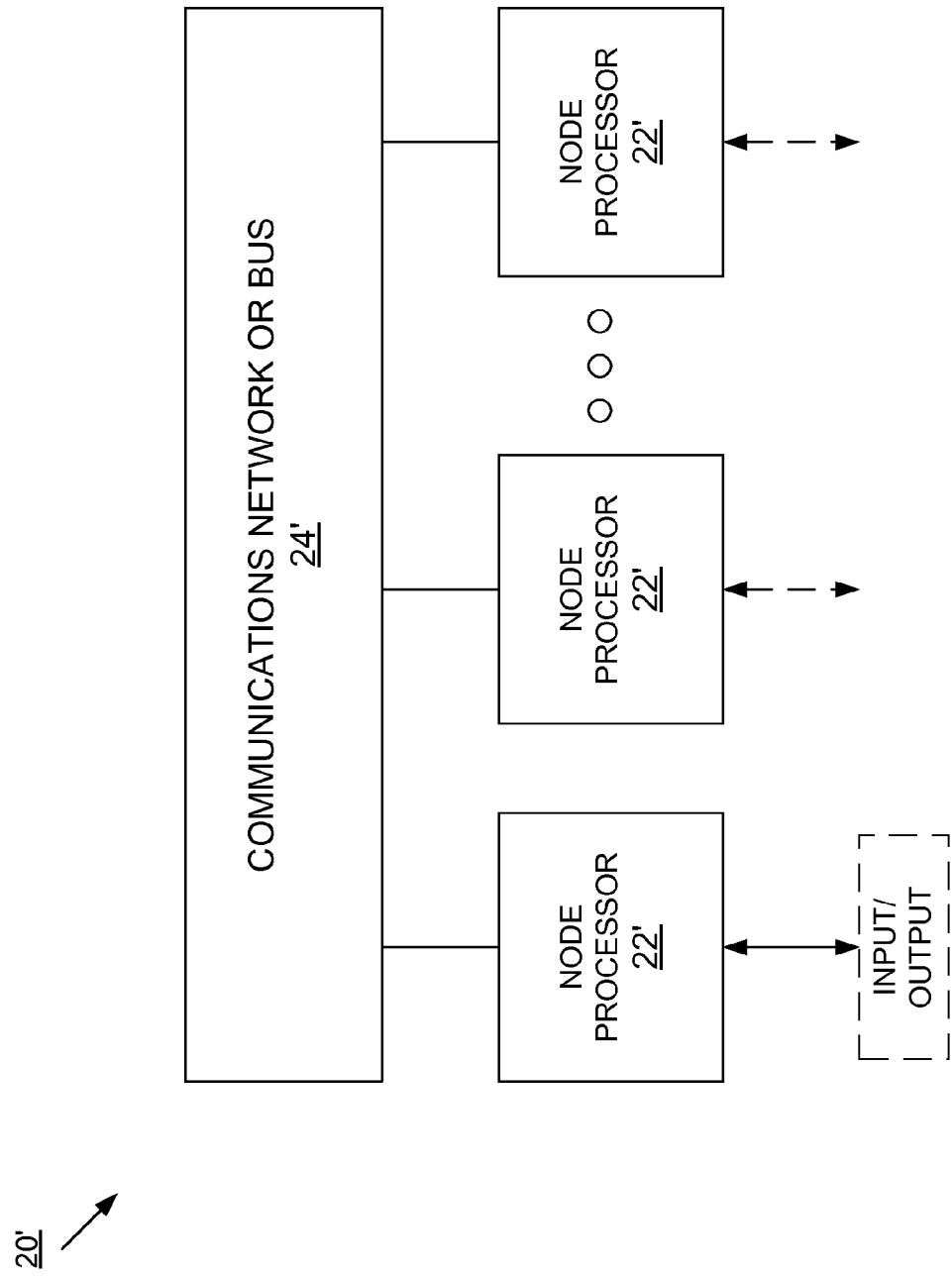
FIG. 3 is a block diagram of another embodiment of a multiprocessor system adapted to perform large graph computations involving sparse matrix operations.

FIG. 3 shows another embodiment of a multiprocessor system 20' for performing large graph computations using sparse matrix operations. (The prime (') after the reference numeral signifies a different embodiment of a feature previously described and associated with a corresponding reference numeral.) The multiprocessor system 20' includes a plurality of matrix processors 22' in communication with each other over a communication network (or bus) 24'. The multiprocessor system 20' can be embodied within a variety of computing devices, examples of which include, but are not limited to, custom designed processors, such as FPGA and ASIC, a server computer, a rack or blade server, a personal computer (PC), a Macintosh computer, a workstation, and a laptop computer. The matrix processors 22' can be conventional cache-based von Neumann machines, implemented with hardware logic, software logic, or a combination thereof. One or more of the processors 22' functions singly or collectively as a master processor, which orchestrates execution of the matrix operation among the matrix processors. Alternatively, the master processor can be one or more additional processors, separate and independent of the matrix processors 22'. In addition, the multiprocessor system 20' can have multiple master processors (a collection of matrix processors or other processors) that cooperate as a master processor. The master processor handles any external I/O (input/output) operations. The communication network 24' can be implemented as one of a variety of network types including, but not limited to, 2-D mesh, 3-D mesh, 2-D toroid, 3-D toroid, tree, fat tree, hypercube, omega, and a bus (conventional or proprietary).

In the multiprocessor system 20 (or multiprocessor system 20'), the coordination of all matrix processing, such as the control, timing, input/output (I/O) functions, the downloading and uploading of data and software programs to and from the node processors, occurs at the control processor 28 (or master processor). Typically, the control processor 28 (or master processor) distributes a large sparse matrix across multiple node processors. When performing matrix operations, the memory usage and computational load are preferably balanced among these node processors. Otherwise, unbalanced memory usage may cause the memory of a node processor to saturate, which can impede the ability for the entire process to execute on the multiple node processors. In addition, an unbalanced computational load can overwork some node processors, while other node processors are idle, significantly reducing the overall computation efficiency.

If balancing memory usage (e.g., for dot add or dot product matrix operations), in one embodiment the control (or master) processor allocates the matrix elements of a sparse matrix substantially equally among the node processors 22 (or matrix processors 22'). A mapping that balances memory usage for dot-add and dot-multiply operations, when identical mapping is used for first, second, and result matrices, consequently operates to balance computational load among the node processors for these operations. A mapping, as used herein, refers to how the matrix elements of a sparse matrix are distributed across the multiple processors.

Figure 4B:
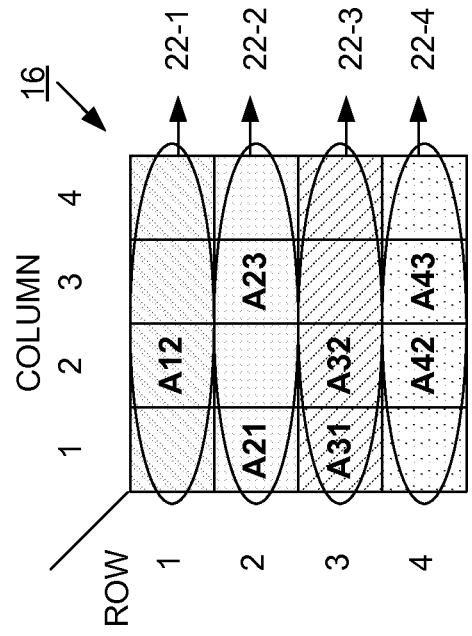
FIG. 4A, FIG. 4B, and FIG. 4C are diagrams of examples of distribution mappings that can be used to distribute non-zero matrix elements of a sparse matrix across the plurality of node processors.
Figure 4A:
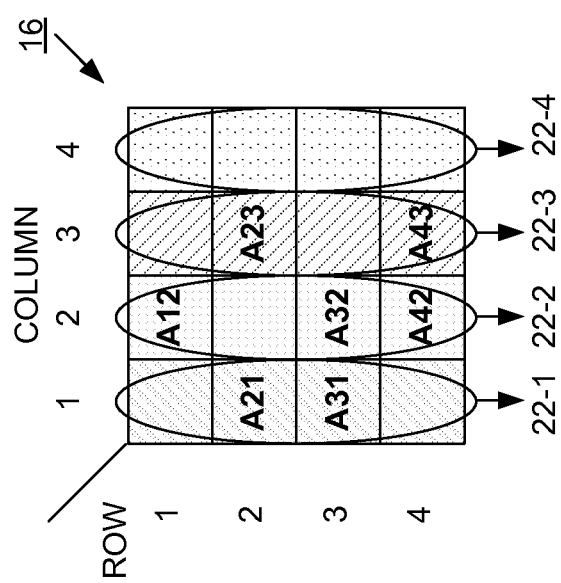

For other types of matrix operations, such as matrix-matrix multiplication, balancing of computational load is of greater importance than balancing memory usage. The multiprocessor system can use any one of a variety of mappings to balance computational load. In general, these mappings are used to distribute the non-zero elements of the adjacency matrix. Examples of distribution mappings include row or column-based mapping, where groups of one or more rows or groups of one or more columns of the sparse matrix are assigned to different node processors. FIG. 4A shows an example of a column-based distribution mapping of the sparse matrix 16, wherein the non-zero matrix elements of the first matrix column are assigned to one node processor (e.g., 22-1), those of the second matrix column to a second node processor (e.g., 22-2), those of the third matrix column to a third node processor (e.g., 22-3), and those of the fourth matrix column to a fourth node processor (e.g., 22-4). FIG. 4B shows a row-based distribution mapping of the sparse matrix 16. The non-zero matrix elements of the first matrix row are assigned to one node processor (e.g., 22-1), those of the second matrix row to a second node processor (e.g., 22-2), those of the third matrix row to a third node processor (e.g., 22-3), and those of the fourth matrix row to a fourth node processor (e.g., 22-4).

Conceivably, a given mapping may produce an uneven data distribution and consequent computational load distribution when some rows or columns have high density of non-zero matrix elements compared to other rows or columns. Such a mapping can cause an imbalanced distribution of non-zero matrix elements (in FIG. 4A, for example, the fourth node processor 22-4 does not receive any non-zero matrix elements, whereas the second node processor 22-2 receives three). To balance the distribution, a different number of rows or columns can be assigned to the node processors to offset an imbalance in matrix element density of the rows or columns. Further, an individual row or column can be divided across multiple node processors if the non-zero matrix element density of that row or column is particularly high, for example, as described in more detail in connection with FIG. 6A and FIG. 6B.

Figure 4C:
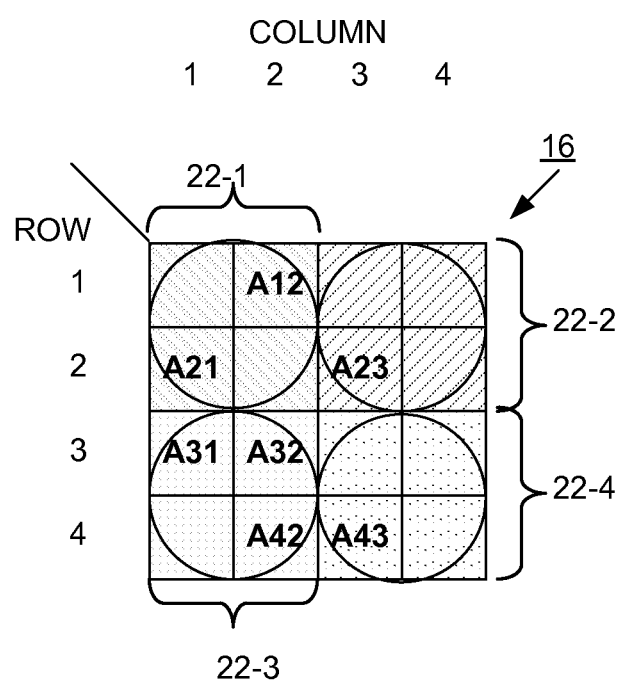

Another type of mapping is a 2-D block-based mapping, where 2-D blocks of the matrix elements are assigned to different processors. FIG. 4C shows an example of a 2D-based distribution mapping of the sparse matrix 16. Each assignment of non-zero matrix elements is a sub-matrix (here, as an illustrative example, a 2×2 matrix) of the sparse matrix 16. For example, the non-zero matrix elements of a first 2×2 sub-matrix are assigned to one node processor (e.g., 22-1), those of a second 2×2 sub-matrix to a second node processor (e.g., 22-2), those of the third 2×2 sub-matrix to a third node processor (e.g., 22-3), and those of the fourth 2×2 sub-matrix to a fourth node processor (e.g., 22-4). Like the row and column-based distribution mappings, 2D-based mapping may cause an imbalanced distribution of non-zero matrix elements among the node processors, particularly when the 2-D matrix density varies greatly from one block to another. To compensate, the 2-D block sizes can be different for different node processors.

In some instances, other distribution mappings may be desired in order to achieve a well-balanced processing throughput requirement on each node processor or to achieve well-balanced usage of the communication network 24 (or 24'). Some matrix distribution mappings can focus on balancing memory usage, others on balancing computational loads, and still other mappings may be tailored for certain matrix operations or for different matrix densities.

Distribution mappings may also be used to enhance communication performance. In one embodiment, the aforementioned randomized routing of communication packets is used to randomize the packet destinations and to improve the performance of the communication network 24. A mapping that induces randomization of the destination processor addresses of sparse matrix operations can cooperate synergistically with such randomized routing.

Although described herein primarily with (full or partial) row or column-based distribution mappings, it is to be understood that any of these or other techniques for distributing the matrix elements of sparse matrices across the node processors can be used. Further, the sizes of the matrices used to demonstrate the principles described herein are small for purposes of simplifying the description and figures. In practice, the sparse matrices are orders of magnitudes larger than are those described herein.

Yet another example, FIG. 5A shows a column-based mapping technique for distributing the matrix elements of the sparse matrix 16 across the four node processors 22-1, 22-2, 22-3, and 22-4. All matrix elements of the matrix are rearranged into a one-dimensional vector 30; the column index (j) as the most significant bits and the row index (i) as the least significant bits. Non-zero matrix elements in the vector 30 are shaded (stripe marks). The vector 30 is partitioned into segments 32-1, 32-2, 32-3, 32-4. For particular hardware implementations, the segments may need to be sequentially numbered. For a completely random sparse matrix, each segment 32 contains approximately the same number of non-zero matrix elements (in this example, two non-zero matrix elements in each segment 32, except for segment 32-4, which has only one). In this example, one segment is assigned to each of the four node processors 22. For example, the non-zero matrix elements of segment 32-1 can be mapped (i.e., assigned) to node processor 22-1, those of segment 32-2 to node processor 22-2, of segment 32-3 to node processor 22-3, and of segment 32-4 to node processor 22-4. To facilitate randomized destinations during communication of the matrix elements over the global bus, segments 22 can be assigned randomly to the node processors 22. The randomization is particularly effective if the number of segments is many times greater than the number of node processors.

FIG. 5B shows another example of a row-based mapping technique for distributing the matrix elements of the sparse matrix 16 across the four node processors 22-1, 22-2, 22-3, and 22-4. The mapping technique is similar to that described in FIG. 5A, except that the most significant bits of the vector 30' correspond to the row index (i) and the least significant bits correspond to the column index (j). The vector 30' is partitioned into segments 32-1', 32-2', 32-3', 32-4', one segment being assigned to each of the four node processors 22.

FIG. 6A and FIG. 6B show an example of a column-based mapping technique for distributing the non-zero matrix elements of a sparse matrix, more specifically, of the adjacency matrix. The technique can be used to balance partial product generation (i.e., computational load). Although primarily designed for use in distributing the non-zero elements of the adjacency matrix, this technique can be applied to the result sparse matrix involved in a given matrix operation (if it is a row-based result matrix) to balance the number of partial products received. Irrespective of the distribution of the other sparse matrix, this technique can effectively balance the computational load of computing partial products among the node processors.

In brief, the technique classifies columns of a sparse matrix into multiple classes. In this example, the technique partitions the columns into three classes (very dense, dense, and sparse) and distributes the non-zero matrix elements across four processors 22-1, 22-2, 22-3, 22-4 (generally, 22). Less or more column classifications can be used. The general principles of the technique are to distribute the very dense column among most, if not all of the node processors, to balance the moderately dense, when the number of segments is much greater than the number of node processors, in a similar manner to that described in connection with FIG. 5A, and to be less methodical distributing the non-zero elements of the sparse columns, which can be randomly distributed.

FIG. 6A shows the reordering 34 of the columns according to matrix-element density; and FIG. 6B shows the mapping 36 of the matrix elements to the four processors. In preparation for mapping, the columns of the sparse matrix are rearranged in order of density (the sparse matrix itself remaining unchanged). Those columns considered very dense 40 have more non-zero matrix elements than a predetermined threshold ($N_{TH1}$). Initially, $N_{TH1}$ can be set, for example, equal to $M*N_P$, where M is equal to any integer value greater than or equal to 1 and $N_P$ equals the number of processors. These very dense columns 40 are divided into $N_P$ segments 41 of an approximately equal number of non-zero matrix elements. The $N_P$ segments are assigned to the $N_P$ processors. In FIG. 6B, the type of shading identifies an example of mapping of the $N_P$ segments to the particular node processors 22.

Next in the order of rearranged columns are those columns, referred to as dense columns, having more than a second threshold ($N_{TH2}$) and less than or equal to $N_{TH1}$ non-zero matrix elements. This set of dense columns 42 is divided into segments 43 of approximately equal size. These segments 43 can span neighboring columns. The segments 43 are assigned randomly among the $N_P$ processors, with the condition that repeat assignments of matrix elements within the same row or column to any one processor are prohibited.

Sparse columns 44 are those with less than or equal to $N_{TH2}$ nonzero elements. For sparse columns 44, the column index is cyclically reordered into $N_P$ approximately equal segments 45 so that the distribution of matrix elements is approximately equal among $N_P$ segments. Some sparse columns 44 are zero-element sparse columns 46, which are included in the segments 45 and are part of the distribution mapping among the node processors.

After the initial reordering of the columns, the $N_{TH1}$ threshold value can be adjusted and the process of re-arranging repeated if the initial distribution is deemed unsatisfactory.

A variation of this technique can be applied to the distribution of the non-zero matrix elements of the results matrix in order to balance the partial product accumulation among the node processors. This technique is built on the general observation that the number of partial products received for each row of the results matrix is approximately directly proportional to the amount of non-zero elements in that row of the adjacency matrix A (assuming that the other matrix B is uniformly distributed). In brief, the technique classifies rows of the adjacency matrix based on their non-zero matrix element density, and extrapolates the results of the row-based classifications obtained from the adjacency matrix to determine the distribution of the non-zero matrix elements of the results matrix. Similar to the above-described manner in which columns were distributed, each very dense row is divided into $N_P$ segments and distributed approximately equally among the node processors, the set of intermediately dense rows $N_P$ are collected, divided into segments, and distributed approximately equally among the node processors, and the non-zero matrix elements of sparse rows are randomly assigned.

Another technique that can be used to balance the partial product accumulation among the node processors is a two-pass process. In a first pass, the multiplication process is performed to acquire actual results for the results matrix, keeping track of the number of partial products generated, and getting a preview of what the results matrix will look like. In the second pass, the non-zero matrix elements are distributed based on the results tallied from the first pass. Often, the same mapping is used for a large number of iterations in graph processing; thus, the additional computations associated with performing two passes is small when compared to the efficiencies gained by balancing the product accumulation among the node processors. In addition, real-world graph processing can involve applying the same adjacency matrix to multiple sets of data that have similar distribution, and in such instances, application of the two-pass method is particularly appropriate.

Figure 7:
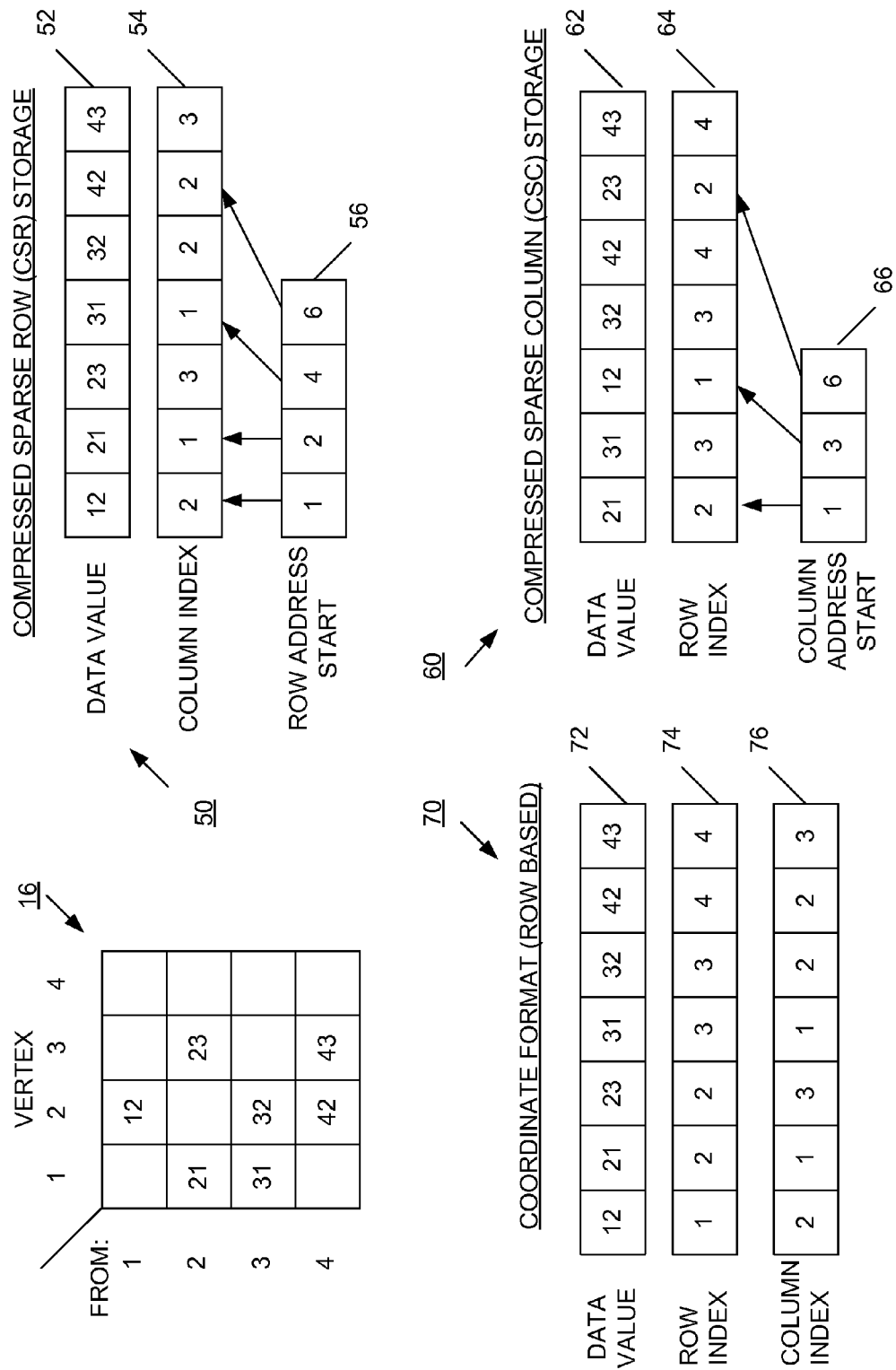
FIG. 7 is a diagram illustrating an example of a 4×4 sparse matrix, a compressed sparse row (CSR) storage format for storing the non-zero matrix elements of the sparse matrix, a compressed sparse column (CSC) storage format, and coordinate storage format.

FIG. 7 illustrates each of the CSR, CSC, and coordinate formats as applied to the example sparse matrix 16. The seven non-zero matrix elements of this sparse matrix 16 correspond to the seven edges of the graph 10 of FIG. 1. For clarity of illustration, the matrix-element data value identifies the particular matrix element (i.e., ith row, the jth column) in the sparse matrix.

The CSR matrix-storage format 50 includes a matrix element array 52, a column index array 54, and a row start-address array 56. The matrix element array 52 contains the non-zero matrix elements in row-by-row order, starting with the first row, and stepping through each row from the first to the last column before moving to the next row. Elements of the column index array 54 have a one-to-one correspondence with the matrix elements in the matrix element array 52. Each element of the column index array 54 identifies the particular column of the sparse matrix 16 for the corresponding matrix element. Elements of the row start-address array 56 are pointers into the column index array 54; each of such pointers starts a new row and points to a location (i.e., a column) where data begins for that row.

The CSC matrix-storage format 60 includes a matrix element array 62, a row index array 64, and a column start-address array 66. The matrix element array 62 contains the non-zero matrix elements in column-by-column order, starting with the first column, and stepping through each column, from the first to the last row, before moving to the next column. Elements of the row index array 64 have a one-to-one correspondence with the matrix elements in the matrix element array 62. Each element of the row index array 64 identifies the particular row of the sparse matrix 16 for the corresponding matrix element. Elements of the column start-address array 66 are pointers into the row index array 64; each of such pointers starts a new column and points to a location (i.e., a row) where data begins for that column.

The coordinate matrix-storage format 70 includes a matrix element array 72, a row index array 74, and a column index array 76. The matrix element array 72 contains the non-zero matrix elements of the sparse matrix. In FIG. 7, this example shows the matrix elements in row-based sorted order, that is, in a row-by-row order, starting with the first row, and stepping through each row, from the first to the last column, before moving to the next row. Some intermediate data values, such as partial product, may be stored in unsorted order, and may have duplicate row/column indices. Elements of the row index array 74 and of the column index array 76 have a one-to-one correspondence with each other and with the matrix elements in the matrix element array 72. For example, the first element in the row index array 74 corresponds to the first element in the column index array 76 and to the first element in the matrix element array. Each pair of corresponding elements—one from the row index array 74 and the corresponding one from the column index array 76—together provide the row and column coordinates for the corresponding matrix element.

Figure 8:
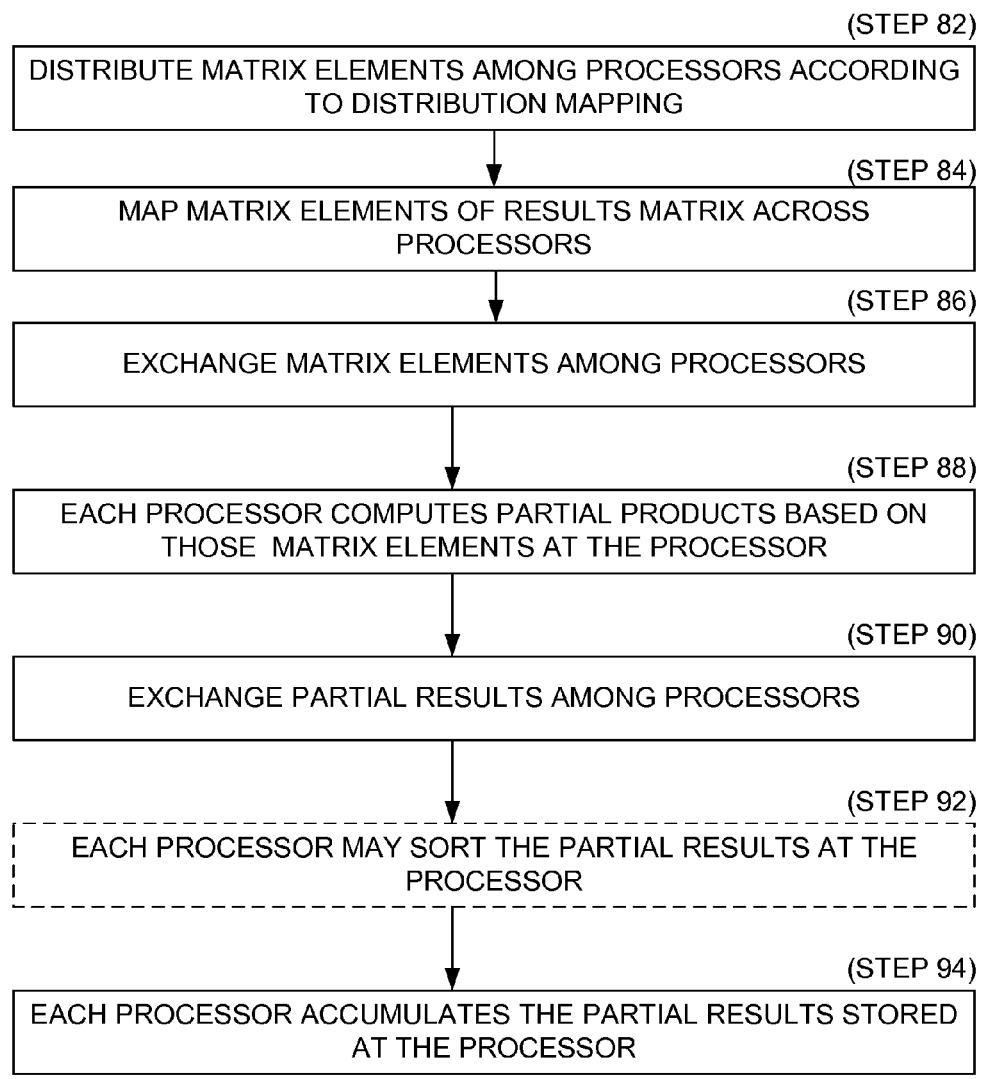
FIG. 8 is a flow diagram of an embodiment of a process of performing a sparse matrix operation as performed by a multiprocessor system.

FIG. 8 shows an embodiment of a process 80 of a sparse matrix operation that takes two input sparse matrices and produces a sparse results matrix. In the description of the operation, reference is made to the multiprocessor system 20 of FIG. 2. At step 82, the control processor 28 distributes the non-zero matrix elements of the matrices among the processors 22 in accordance with a distribution mapping. The distribution mapping can be, for example, column-based or row-based. The control processor 28 also maps (step 84) matrix elements of the sparse results matrix across the processors 22. The processors 22 exchange (step 86) non-zero matrix elements with the other processors over the communications network 24: each processor transmits certain non-zero matrix elements held by that processor to their appropriate destination processors, such transmitted non-zero matrix elements to be used by those destination processors in their computations, while receiving non-zero matrix elements from the other processors to be used locally in its own computations.

After the exchange of the non-zero matrix elements, each processor 22 computes (step 88) partial results for subsequent incorporation into the results matrix. Not all matrix operations produce partial results: for example, sparse-matrix matrix multiplication produces partial products, but other operations, such as dot add and dot multiply, do not produce partial results. Over the communications network 24, the processors 22 then exchange (step 90) partial results with other processors 22: each processor transmits certain partial results to the appropriate destination processors, namely, those processors assigned those matrix elements of the sparse results matrix, and receives partial results from the other processors to be used locally in its own computations. After the exchange of partial results, each processor 22 may sort (step 92) the partial results for the matrix elements mapped to that processor (depending upon the particular sparse matrix operation), and computes (step 94) final values for the results matrix elements assigned to that processor.

Figure 9:
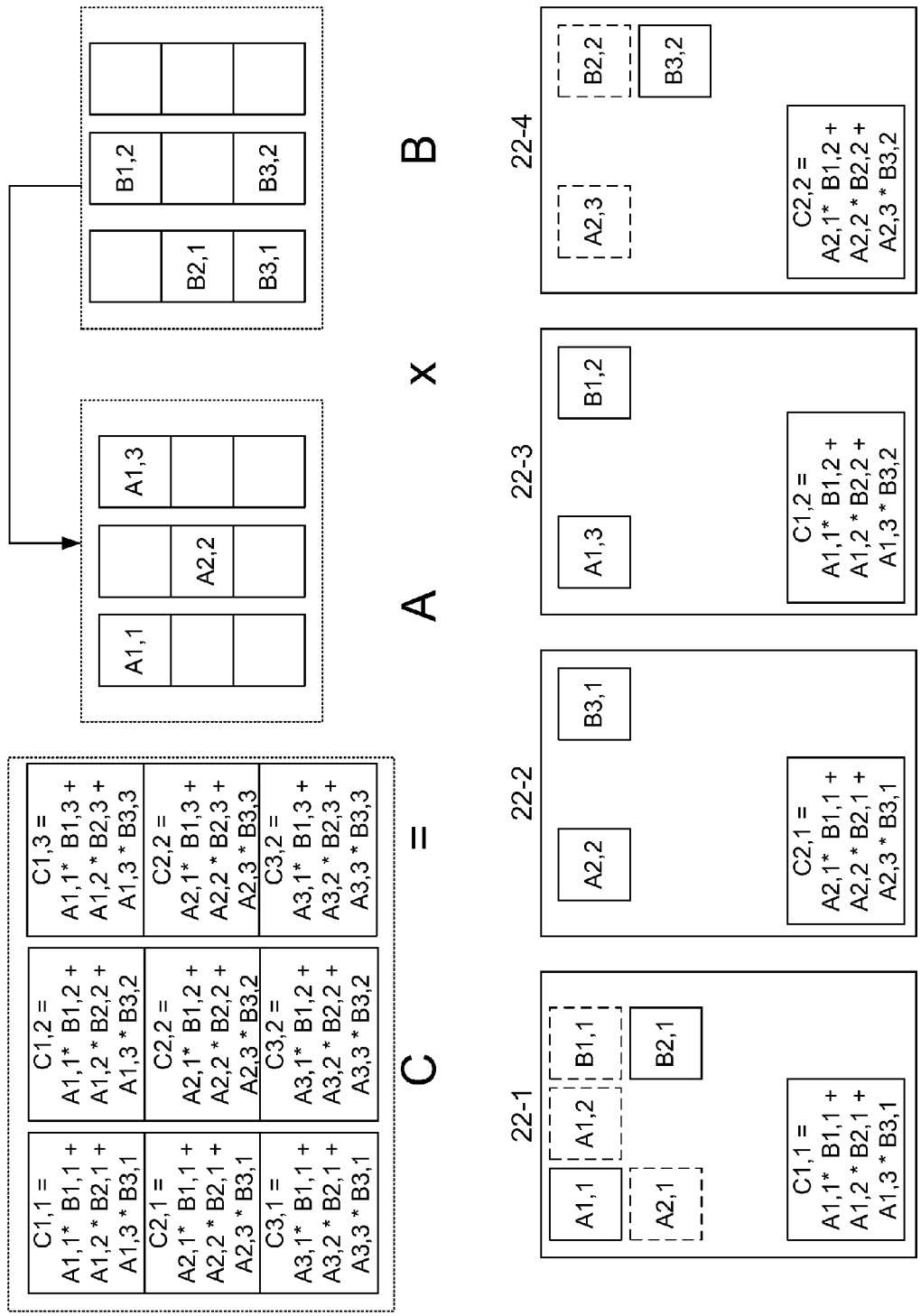
FIG. 9 is a diagram illustrating an example application of the process of FIG. 8 to a sparse matrix-matrix multiplication operation.

FIG. 9 is a diagram illustrating an example of the process 80 (FIG. 8) as applied to a sparse matrix-matrix multiplication operation involving two input sparse matrices A and B and a sparse results matrix C. In this example, sparse matrices A, B, and C are each a 3×3 matrix. Sparse matrix A has non-zero elements $A_{1,1}$, $A_{1,3}$ and $A_{2,2}$. Sparse matrix B has non-zero elements $B_{1,2}$, $B_{2,1}$, $B_{3,1}$, and $B_{3,2}$. The results matrix C has nine matrix elements $C_{1,1}$, $C_{1,2}$, $C_{1,3}$, $C_{2,1}$, $C_{2,2}$, $C_{2,3}$, $C_{3,1}$, $C_{3,2}$, and $C_{3,3}$. For this example illustration, each results matrix C element is equal to a sum of partial products computed by multiplying a row of matrix A elements with a column of matrix B elements (specifically, matrix element $C_{1,1} = A_{1,1}*B_{1,1} + A_{1,2}*B_{2,1} + A_{1,3}*B_{3,1}$; matrix element $C_{1,2} = A_{1,1}*B_{1,2} + A_{1,2}*B_{2,2} + A_{1,3}*B_{3,2}$; matrix element $C_{2,1} = A_{2,1}*B_{1,1} + A_{2,2}*B_{2,1} + A_{2,3}*B_{3,1}$; and matrix element $C_{2,2} = A_{2,1}*B_{1,2} + A_{2,2}*B_{2,2} + A_{2,3}*B_{3,2}$).

The control processor 28 distributes the non-zero matrix elements of sparse matrices A and B across a plurality of node processors in accordance with a distribution mapping. Consider, for illustrative purposes, that the control processor 28 segments the matrix elements of each sparse matrix A, B according to the column-based mapping process described in connection with FIG. 5A. As a result of the mapping process, in this example each node processor receives approximately one non-zero matrix element from each of the sparse matrices A, B. Matrix elements shown in phantom at a given node processor are the zero matrix elements included in the segment of sparse matrix assigned to the node processor. In this example, node processor 22-1 receives non-zero matrix elements $A_{1,1}$ and $B_{2,1}$, node processor 22-2 receives non-zero matrix elements $A_{2,2}$ and $B_{3,1}$, node processor 22-3 receives non-zero matrix elements $A_{1,3}$ and $B_{1,2}$, and node processor 22-4 receives non-zero matrix element $B_{3,2}$.

Further consider, for example, that the control processor 28 assigns matrix elements $C_{1,1}$, $C_{2,1}$, $C_{1,2}$, and $C_{2,2}$ to node processors 22-1, 22-2, 22-3, and 22-4, respectively (the other matrix elements of the results matrix are omitted to simplify the description). To perform the sparse matrix multiplication operation, each node processor computes those partial products that involve the non-zero matrix A elements stored by that node processor. For example, node processor 22-1, which stores non-zero matrix element $A_{1,1}$, computes partial products $A_{1,1}*B_{1,1}$ and $A_{1,1}*B_{1,2}$. To perform these computations, each node processor needs to receive those non-zero matrix B elements not presently stored at that node processor from the node processors that are storing those non-zero matrix B elements. Referring again to node processor 22-1, for example, node processor 22-1 needs to receive non-zero matrix element $B_{1,2}$ from node processor 22-3 (note, matrix element $B_{1,1}$ is a zero matrix element, and is not exchanged). In addition, the node processor 22-1 also transmits matrix element $B_{2,1}$ to the node processor 22-2 (where it will be multiplied with the matrix element $A_{2,2}$); node processor 22-2 transmits matrix element $B_{3,1}$ to the node processor 22-3 (where it will be multiplied with the matrix element $A_{1,3}$); and node processor 22-4 transmits matrix element $B_{3,2}$ to the node processor 22-3 (where it too will be multiplied with the matrix element $A_{1,3}$).

After the exchange of the non-zero matrix elements, each processor 22 computes and exchanges partial products with the other processors 22. In this example, the node processor 22-1 transmits partial product $A_{1,1}*B_{1,2}$ to node processor 22-3 for use computing results matrix element $C_{1,2}$, the node processor 22-2 may transmit partial product $A_{2,2}*B_{2,2}$ to node processor 22-4 for use computing results matrix element $C_{2,2}$, and the node processor 22-3 transmits partial product $A_{1,3}*B_{3,1}$ to node processor 22-1 for use computing results matrix element $C_{1,1}$. (Preferably, a node processor does not transmit a partial product equal to zero). No transmissions are needed for partial products $A_{1,1}*B_{1,1}$, $A_{2,2}*B_{2,1}$, and $A_{1,3}*B_{3,2}$ because these partial products are already at their destination node processor (having been computed by the node processor that will subsequently use the partial product to compute a final value).

After the exchange of partial products, each processor 22 sorts the partial products stored at that node processor. Partial products corresponding to the same results matrix element will have the same index value, and sorting brings these partial products together in a sorted list of results matrix elements. Having related partial products adjacent to each other in the sorted list accelerates the accumulation process. Each node processor accesses and steps through the list of sorted results matrix elements to produce final values for each of the results matrix elements assigned to that node processor. Accumulating (summing) the partial products belonging to the same results matrix element produces a final value for that results matrix element. Alternatively, accumulation can occur during a sorting process that employs multi-step sorting.

Figure 10:
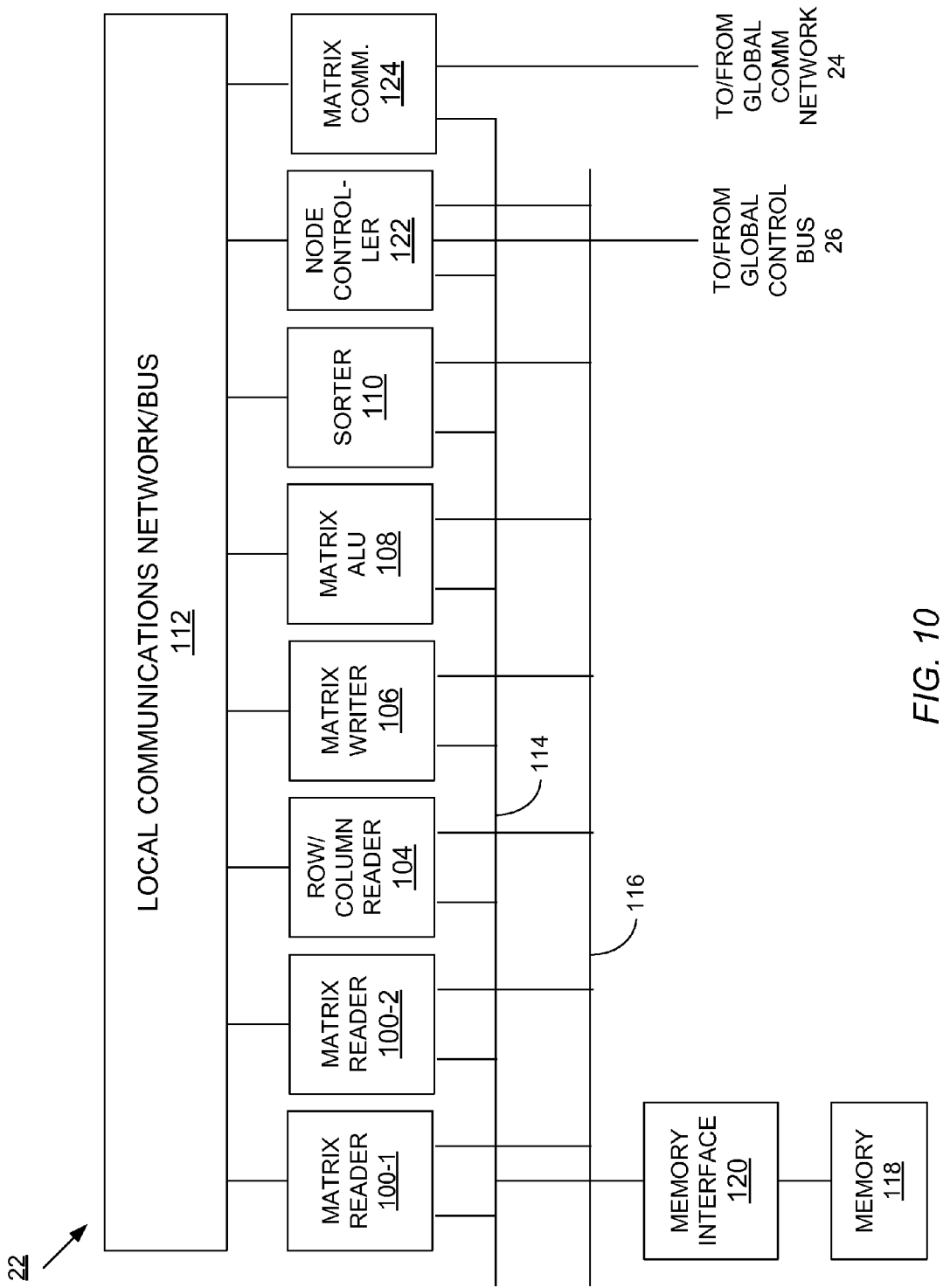
FIG. 10 is a diagram of an embodiment of a node processor of a multiprocessor system, the node processor having a plurality of accelerator module circuits connected to a local communications network or bus.

FIG. 10 shows an embodiment of architecture for the node processor 22 including a plurality of specialized accelerator module circuits (or accelerator modules, for short), each designed to perform a specific task related to performing matrix operations. The specialized accelerator modules perform most of the matrix operations employed during execution of a sparse matrix algorithm, with multiple specialized accelerator modules operating simultaneously (i.e., in parallel) to produce the result.

A departure from cache-based von Neumann machines, which are the basis for most conventional general-purpose processor architectures, the architecture of the node processor 22 preferably lacks a cache because the cache-miss rate tends to be high in graph processing. Generally, the accelerator modules provide a higher computational throughput than conventional von Neumann processor architectures by enabling parallel and pipelined matrix-related operations. In a conventional processor, the microprocessor typically computes all processing tasks, such as memory access, communication-related processing, arithmetic/logical operations, and control, often performing such tasks serially and requiring many clock cycles to perform, thereby lowering the overall computational throughput. In the architecture of the node processor 22, each accelerator module performs its specialized task, with some of the accelerator modules performing many of the tasks concurrently (i.e., in parallel).

In addition, each accelerator module is designed to operate as fast as practically possible so that the accelerator module does not become a limiting factor in the overall throughput. Preferably, each accelerator module is designed to keep pace with the fastest possible data rate, which is processing one matrix element or one partial product per clock cycle. Notwithstanding, a given accelerator module may not use some clock cycles to perform an operation. In order to achieve the desired speed of execution, each accelerator module is preferably implemented entirely in hardware, although embodiments of accelerator modules can be implemented with software logic, or a combination of hardware and software. Further acceleration may be gained by having multiple copies of a given acceleration module operating in parallel to process multiple matrix elements or partial products per clock cycle.

In the embodiment shown, the accelerator modules include a plurality of matrix readers 100-1, 100-2 (generally, 100), a row/column reader 104, a matrix writer 106, a matrix ALU (arithmetic logic unit) 108, and a sorter 110. Each of the specialized accelerator modules is connected to a local communication network or bus 112, a memory bus 114, and a control bus 116. The accelerator modules can communicate with each other over the local communication network 112. The node processor 22 can have multiple copies of a particular accelerator module (as illustrated by the two matrix readers 100). Other accelerator modules, copies of or different from those shown, can be added to the node processor 22. Not every node processor 22 needs to be identically configured (i.e., with the same sets of accelerator modules) as every other node processor 22

Embodiments of the local communication network 112 include proprietary and conventional general-purposes busses and protocols, examples of which include, but are not limited to a Peripheral Component Interconnect (PCI) bus, an Industry Standard Architecture (ISA) bus, and an Enhanced Industry Standard Architecture (EISA) bus. In one embodiment, the local communication network 112 is directly connected to the global control bus 26 instead of being indirectly connected through the node controller 122. In an alternate embodiment, the local communication network 112 can also perform the roles of the memory bus 114, control bus 116, or both.

Memory 118 connects to the memory bus 114 through a memory interface unit 120. The memory 118 for the node processor can be implemented with various memory types or combinations thereof, including SRAM (static random access memory), DRAM (dynamic RAM), and DDR (double data rate), DDR2, and DDR3 SDRAM (Synchronous DRAM). The memory 118 can be internal to the integrated component (IC) of the node processor 22, external to the IC, or a combination thereof. For fast data access, SRAM is preferable, whereas for high-density, SDRAM may be preferred. Non-volatile memory, for example, Flash memory and disk drives, can provide long-term storage and additional storage resources for applications with high storage requirements.

The memory interface module 120 receives memory read requests from other accelerator modules through the memory bus 114, reads data from the memory 118, and provides the read data to the accelerator modules through memory bus 114. Similarly, the memory interface module 120 receives memory write requests from the accelerator modules through memory bus 114 and writes the received data into the memory 118. When multiple memory accesses (reads and/or writes) are received concurrently, or near in time, from multiple accelerator modules, the memory interface module 120 executes the requested memory access according to a priority algorithm. Priority among the accelerator modules and the priority algorithm can be loaded into the memory interface module 120 before each computational phase. Those accelerator modules requesting memory access may transmit a priority with its memory access request. Alternatively, the memory interface module 120 can look up the priority and priority algorithm, depending on the currently executing computational phase. Preferably, the memory interface module 120 is adapted to keep pace with the maximum memory access speeds of the memory so that the memory interface module 120 does not become a bottleneck in the matrix operation or data movement. All information needed to specify each phase of the memory operation for the memory interface module 120, including information related to the memory access priority algorithm, can be loaded from the node controller module 122 beforehand.

If the memory 118 consists of SDRAM, preferably set up times associated with SDRAM are avoided to the extent possible. For this objective, memory access is performed in large batches of continuous sequential memory access addresses, whenever possible. To support batch memory accesses efficiently, those accelerator modules that access the memory 118 and the memory interface module 120 can employ temporary storage memory, for example, FIFO.

The matrix data (which include matrix elements of the matrix) are stored in the memory 118 in any one of a variety of matrix-storage formats; that is, formats for storing the non-zero matrix elements of the matrix in memory 118 and for locating such stored matrix elements. Examples of such matrix-storage formats include a compressed sparse row (CSR) format, a compressed sparse column (CSC) format, and a coordinate format. In the CSR format, the matrix element data and column index are stored as pairs in an array format. Another array stores a row start address for each column; these pointers can be used to look up the memory locations in which the rows are stored. In the CSC format, the matrix element data value and row index are stored as pairs in an array format. Another array stores a column start address for each row. The coordinate format stores data related to a matrix element together in array format, such related data including the matrix element data value, row index, and column index. The coordinate format is a convenient mechanism for storing randomly ordered matrix elements or partial products. The CSR, CSC, and coordinate formats are illustrated with an example in connection with FIG. 7.

Also connected to the memory bus 114 and control bus 116 is a node controller module 122 and a matrix communication module 124. The node controller module 122 is in communication with the control bus 26 of the multiprocessor system 20 (FIG. 2), referred to as the global control bus 26, to distinguish it from the local control bus 116 of the node processor 22. The node controller module 122 can be implemented with a conventional general-purpose microprocessor, one having its own memory and cache in addition to having access to the memory 118 of the node processor 22 through the memory interface module 120. The node controller module 122 may be cache-based because most of its processing is conventional processing.

In general, the node controller module 122 establishes and coordinates the matrix operations among the various accelerator modules of the node processor 22. Over the global control bus 26, the node controller module 122 receives a software program and signals that are used to perform process control, timing, and input/output (I/O) functions throughout the graph algorithm computation. The loading of data into and fetching of data from the memory 118 over the global control bus 26 occurs through the node controller module 122.

The node controller module 122 can be adapted to perform other processing tasks or operations not supported by the accelerator modules. Usually, these operations represent a minor fraction of the total computational throughput for most implementations of graph algorithms, and any lower throughput resulting from execution of these operations by the node controller module, rather than by the accelerator modules, usually has little impact on the overall throughput of the node processor 22.

During a matrix operation, the node controller module 122 receives its software program and data from the control processor 28. Before the matrix operation begins, the node controller module 122 loads the control variables into the control registers and control memory of the accelerator modules using the local control bus 116. The control variables include the types of matrix operations to be performed, the matrix memory storage locations, the matrix distribution mapping, and other relevant information. The node controller module 122 also performs timing control.

As an example of timing control, after all accelerator modules receive the control variables, the accelerator modules signal 'ready' to the node controller module 122 through the control bus 116. In response to receiving a ready signal from each of the accelerator modules, the node controller module 122 transmits a 'start' signal through the control bus 116. The node controller module 122 waits until all the accelerator modules report their completion of the current processing phase before moving on to the next processing phase.

The matrix communication module 124 handles communication with other node processors 22, either preparing messages for transmission or processing received messages. When preparing a message for transmission, the matrix communication module 124 includes the matrix element (or partial product) within the message in coordinate format (FIG. 7), and attaches a header that contains the address of the destination node processor. The matrix communication module 124 computes this destination address using the distribution mapping determined by the global control processor 28. The header can also contain error detection and correction bits, and other relevant information, such as the priority of the message. The matrix communication module 124 is in communication with the communication network 24 of the multiprocessor system 20 (FIG. 2), referred to as the global communication network 24, to distinguish it from the local node communication network 112 of the node processor 22. Onto the global communication network 24, the matrix communication module 124 sends the prepared message for forwarding to the destination node processor.

Upon receiving a message from the global communication network 24, the matrix communication module 124 executes such operations as decoding, performing error correction, and passing the matrix element or partial product contained in the received message into the node processor 22 in coordinate format. The received matrix elements or partial products may be stored in the memory 118 (e.g., by the matrix writer module 106) for further processing. All information necessary to specify each phase of the matrix operation for the communication module 124 is loaded beforehand from the node controller module 122.

The matrix reader modules 100 are configured to read matrix data efficiently from the memory 118. (Some matrix operations, such as C=A.+B, can involve two matrix reader modules. Each of the matrix reader modules is assigned to read matrix elements from a particular matrix, one reader module for reading matrix A and the other reader module for reading matrix B.) Before each computational phase of a matrix operation, the node controller module 124 informs each matrix reader module 100 regarding which matrix elements are to be accessed and the mapping information, if such mapping information is not currently present at that matrix reader module 100. This mapping information identifies the location in the memory 118 where each matrix element is stored, the storage format of the matrix element, and the destination within the node processor 22 to which the computational result is sent.

In brief overview, each matrix reader module 100 generates and sends memory read requests to the memory interface module 120 through memory bus 114. When reading a matrix element in a matrix format that has row or column pointer arrays, such as CSR or CSC, the matrix reader module 100 first generates an appropriate memory read request for the pointer data, and then, depending on the pointer data retrieved from the memory, generates the memory read request for the matrix element. After receiving from the memory interface module 120 the matrix element read from the memory 118, the matrix reader module 100 sends the matrix element over the local communications network 112 to the appropriate destination specified earlier by the node controller module 122, for example, the matrix ALU module 108.

The row/column reader module is adapted to read an entire matrix row or matrix column stored in the memory 118 of the node processor 22. At times, only a portion of an entire row or column may be stored in the memory 118, in which event, the row/column reader module 104 reads those matrix elements of the row or column presently contained in the memory 118. To read a row or a column, the sparse row/column reader module 104 generates the appropriate memory read requests based on the mapping information and sends the requests to the memory interface module 120 through the memory bus 114. For reading matrix data in a storage format having row or column pointer arrays, such as the CSR or CSC formats, the row/column reader module 104 generates the appropriate memory read requests for both the pointer data and the matrix elements, as previously described. When the adjacency matrix A is stored in CSC format, the task of acquiring an entire column stored at a node processor can be accomplished just by acquiring the column address start information.

Generally, the row/column reader module 104 partakes in matrix-matrix multiplication operations. For example, consider execution of a C=A*B operation, with matrix A stored in a column-based format, such as CSC. In the matrix-matrix multiplication operation, each matrix element in matrix B is multiplied with all the matrix elements in a column of matrix A. The row/column reader module 104 facilitates this matrix multiplication operation by acquiring an entire column of matrix elements of matrix A from the memory 118. The received memory read results (i.e., all available matrix elements of a column of matrix A) are then forwarded to the matrix ALU module 108 for multiplication. All information necessary to specify each computational phase for the row/column matrix reader module 104 is loaded from the node controller module 122 before generation of the memory read requests takes place.

The matrix writer module 106 writes matrix data into the memory 118 in a storage format, such as CSR, CSC, or coordinate format. The matrix writer module 106 sends a memory write request containing the write data and address information to the memory interface module 120 through the memory bus 114. The mapping information and storage format information is used to generate the appropriate memory write addresses. To write matrix-related data in a storage format with row or column pointer arrays, such as in CSR or CSC, the matrix write module 106 generates the appropriate memory write requests for pointer data and matrix elements. All information needed for each computational phase is received from the node controller module 122 before the matrix write module 106 generates the memory write requests.

The matrix ALU (arithmetic logic unit) module 108 performs arithmetic and logical operations including add, subtract, multiply, divide, compare, minimum, maximum, AND, OR, XOR, NAND, and other simple or complex operations. To perform these operations, the matrix ALU module 108 includes one or more accumulators. Typically, the matrix ALU module 108 receives input data from any one or more of the matrix reader modules 100, the matrix row/column reader module 104, and sorter module 110, and transmits its results to the matrix writer module 106 or to the matrix communication module 124. The results produced by the matrix ALU module 108 are typically a partial product or a matrix element in the coordinate format.

Before performing an operation, the matrix ALU module 108 receives all information necessary to specify each computational phase from the node controller module 122. The matrix ALU module 108 can receive one or two operands from inputs and/or accumulators to perform a specified operation. The specified operation can direct the ALU module 108 to operate on a matrix-element data value, row index, or column index, individually or simultaneously. That is, multiple independent simultaneous versions of the specified operation can occur simultaneously on matrix-element data values, row indices, and column indices. The results of the specified operation can pass to another accelerator module or be stored in the accumulator(s) for further processing. Operations can also be conditional. For example, the matrix ALU module 108 may be required to sum successive matrix elements only when the indices (row and column) of those matrix elements are identical.

In addition, in the course of its operations, the matrix ALU module 108 may define the data type of computed data, depending upon the type of operation being performed. For example, the ALU module 108 can redefine a matrix-element data value as a row index, or swap column index values with row index values and row index values with column index values. As another example, during a matrix multiplication operation ($C_{i,j} = \Sigma^n_{k=1} A_{1,k} * B_{k,j}$), a computed partial product takes on the row index value of the matrix A elements and the column index value of matrix B elements The sorter module 110 performs sort operations, on the indices of matrix elements or of partial products, on the data values of the matrix elements, or on combinations thereof. In one embodiment, the sorter module 110 sorts according to combined index values. For example, a row index may be used for the MSBs (most significant bits) of a combined index, while a column index may be used for the LSBs (most significant bits) of the combined index. In another embodiment, the sorter module 110 sorts according to the matrix element data values. The information necessary to specify each computational phase for the sorter module 110 can be loaded from the node controller module 122 before that phase begins.

Many matrix operations need indices to be sorted to find matrix elements or partial products with duplicate indices before performing that matrix operation. Matrix elements also often need to be sorted by indices before the matrix elements are written into the memory 118. Some sorting algorithms, such as merge sorting, require multiple stages of sorting, which require generating intermediate results and writing them into the memory. Accordingly, for many matrix operations, sorting can dominate the computational throughput.

The sorter module 110 performs these multiple stages of sorting by sending memory read requests for data to the appropriate matrix reader module 100 and by writing the intermediate or final results into the memory 118 through the matrix writer module 106. When all the stages of sorting are completed, the result is a sorted list of matrix elements, which then can be written into the memory 118 as a matrix (e.g., a sparse matrix). The sorter module 110 may also send the intermediate results to the matrix ALU module 108 for accumulation before the final results are sent to the matrix writer module 106.

When sorting a large number of entries, conventional processor architecture can require many clock cycles per entry. A specialized sorting architecture, in comparison to the conventional processor architecture, can use significantly fewer clock cycles per entry for sorting large number of entries. An example of specialized sorting architecture for the sort module 110 is the systolic k-way merge sorter architecture described in U.S. patent application Ser. No. 12/403,903, filed Mar. 13, 2009, the entirety of which application is incorporated by reference herein.

Figure 11:
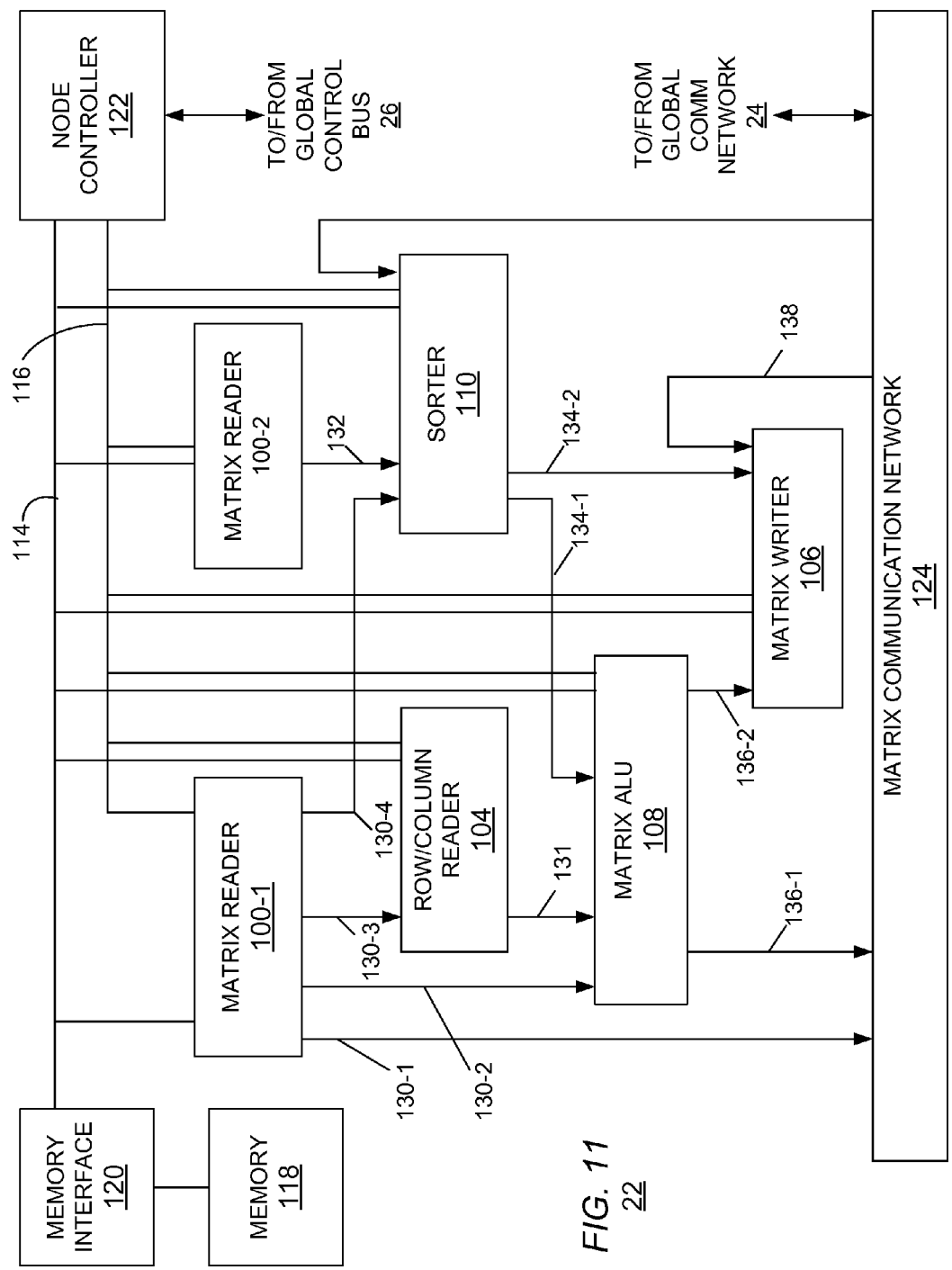
FIG. 11 is a block diagram of another embodiment of a node processor having a plurality of accelerator module circuits interconnected by dedicated communication links.

FIG. 11 shows another embodiment of a node processor 22 having the specialized accelerator modules of FIG. 10 interconnected by a limited number of dedicated communication links between certain accelerator modules, instead of a general-purpose communications network like the local communications network 112 of FIG. 10. Each communication link is 'dedicated' in that the communication link is between only two accelerator modules and is particularly adapted to carry the type of data being transmitted between those two accelerator modules. Input FIFOs, output FIFOs, other buffer memory, or combinations thereof may be used on these communication links to buffer the communication data. Advantageously, dedicated link connections are typically easier than a general-purpose high-speed communications network to construct on an IC. Similar to the embodiment of FIG. 10, each of the accelerator modules 100, 104, 106, 108, and 110 is in communication with the node controller module 122 through the memory bus 114 and control bus 116.

In this embodiment, the first matrix reader module 100-1 has four dedicated communication links, which include a first link 130-1 to the matrix communication module 124, a second link 130-2 to the matrix row/column reader 104, a third link 130-3 to the matrix ALU module 108, and a fourth link 130-4 to the sorter module 110. The matrix row/column reader 104 has a dedicated communication link 131 to the matrix ALU module 108. A dedicated communication link 132 connects the second matrix reader 100-2 to the sorter module 110. The sorter module 110 has a dedicated communication link 134-1 to the matrix ALU module 108 and another dedicated communication link 134-2 to the matrix writer module 106. The matrix ALU module 108 has a dedicated communication link 136-1 to the matrix communication module 124 and another dedicated communication link 136-2 to the matrix writer module 106. The matrix communication module 124 also has a dedicated communication link 138 to the matrix writer module 106.

The dedicated communication links correspond to the general direction of flow of data through the various accelerator modules during matrix operations to be performed by this node processor 22. Node processors 22 can be customized as desired with particular specialized accelerator modules and dedicated communication links that perform a particular matrix operation efficiently.

Figure 12:
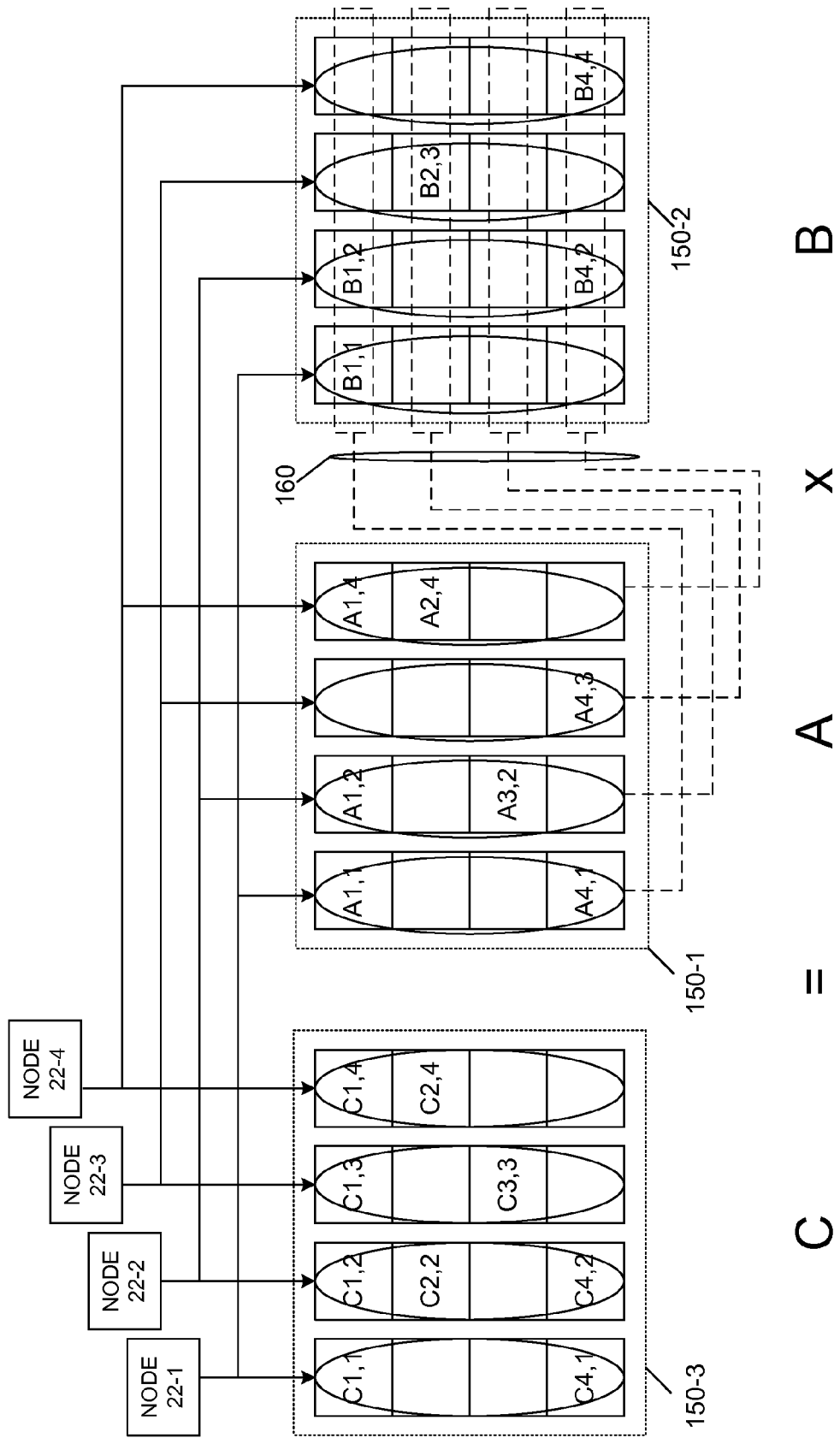
FIG. 12 is a diagram illustrating an example of a matrix-matrix multiplication operation performed by the multiprocessor system of FIG. 2.
Figure 13:
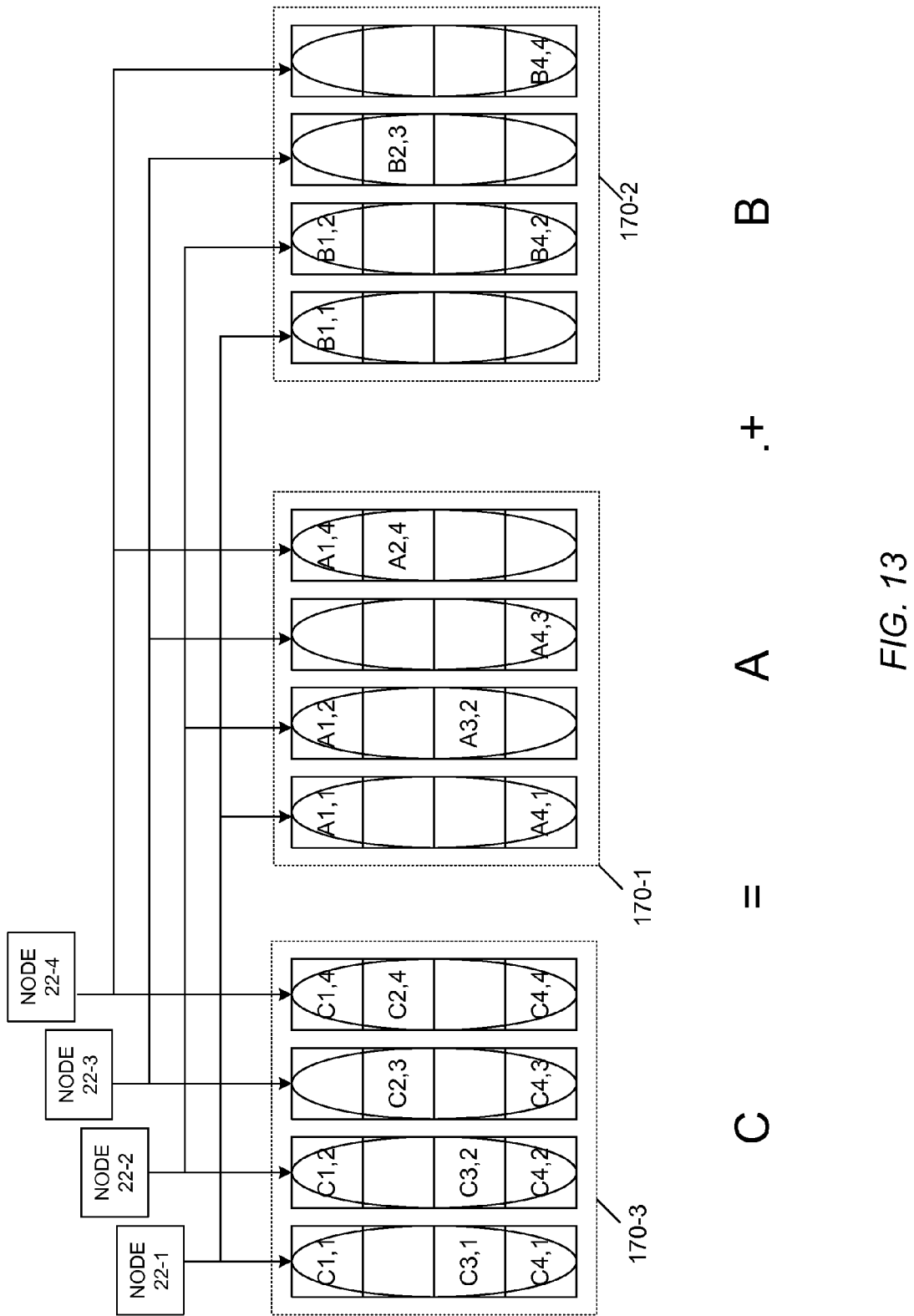
FIG. 13 is a diagram illustrating an example of a dot-sum matrix operation performed by the multiprocessor system of FIG. 2.

FIG. 12 and FIG. 13 provide examples of commonly used sparse matrix operations that the specialized accelerator modules are particularly suited to perform. In many graph algorithm and sparse matrix algorithm applications, much processing time is expended multiplying two sparse matrices. In performing a C=A*B ($C_{i,j}=\Sigma^n_{k=1} A_{i,k} * B_{k,j}$) operation, the operation sequences can be slightly different depending on the matrix representation. The matrices A, B, and C can have the same or different matrix-to-processor mappings from that described without departing from the principles set forth herein.

FIG. 12 shows an example of a matrix-matrix multiplication operation involving the multiplication of two matrices 150-1 (matrix A) and 150-2 (matrix B) that produces results matrix 150-3 (matrix C). In matrix-matrix multiplication operations, if a given node processor needs to generate and send significantly more partial products than other node processors because of an imbalance, the other node processors may become idle until the given node processor finishes generating all of its partial products. Similarly, if a given node processor receives significantly more partial products than the other node processors because of an imbalance, the other node processors may become idle until the given node processor finishes sorting and accumulating all of its received partial products. In addition, the given node processor may run out of memory space from too many received partial products. Accordingly, the processing load is preferably balanced among the node processors 22 by balancing the partial products generated by each node processor and the partial products received by each node processor. In this example, the matrix multiplication operation is distributed across four node processors 22-1, 22-2, 22-3, and 22-4 (generally, 22).

With such balancing taken into consideration, the matrices are stored at the node processors, here, for example, in column-based matrix-storage format. Each node processor stores a different column of each of the matrices A, B, and C: node processor 22-1 stores the first column of each matrix A, B, and C; node processor 22-2 stores the second column of each matrix; node processor 22-3 stores the third column of each matrix; and node processor 22-4 stores the fourth column of each matrix. Other column-based or row-based mappings can be used without departing from the principles described herein. For large matrices, a given node processor 22 can hold multiple columns of a given matrix. The column-based mapping could be adjusted so that each of the node processors receives a similar number of matrix elements and has a similar processing load for optimal memory and load balancing.

During an initial phase of the matrix multiplication operation, each of the node processors 22 sends the row elements of matrix B to the other node processors 22 containing corresponding columns of matrix A as shown with arrows 160. In other words, the data values of matrix elements $B_{k,j}$ are sent to those node processors containing the data values of matrix elements $A_{i,k}$ as shown. The node processors 22 send the matrix elements $B_{k,j}$ over the local communications network 112.

During this phase, various accelerator modules of each node processor participate in the process of sending the matrix elements $B_{k,j}$ to those other node processors containing corresponding matrix elements $A_{i,k}$. The matrix reader module 100-1 reads the matrix B elements from the memory 118 and sends them to the matrix communication module 124. The matrix communication module 124 sends the matrix B elements to their destination node processors. The matrix communication module 124 also receives the matrix B elements from the other node processors and sends them to the matrix writer module 106. The matrix writer module 106 writes the received matrix B elements into the memory 118 as the matrix elements arrive and in the order of arrival. The matrix B element data, row index, and column index are written into the memory 118, for example, in the matrix-storage coordinate format. Sorting of matrix elements at this time based on indices is not required because the generation of a partial product does not have to be done in any particular order.

In a subsequent phase of the matrix multiplication operation, each node processor generates and sends partial products $P_{i,j,k}=A_{i,k}*B_{k,j}$ to those node processors that are to contain the resulting matrix element $C_{i,j}$. In brief overview, each node processor generates partial products $P_{i,j,k}$ ($P_{i,j,k}=A_{i,k}*B_{k,j}$) by multiplying the received matrix B elements with the matrix A elements stored at that node processor. Specifically, the matrix reader module 100-1 reads the received matrix elements $B_{k,j}$ from the memory 118 and sends the matrix elements $B_{k,j}$ to the matrix ALU module 108. For each matrix element $B_{k,j}$ read, the row/column reader module 104 reads all of the matrix A elements belonging to the corresponding column ($A_{i,k}$ for all i) stored in its memory 118 and sends these matrix A elements to the matrix ALU module 108. The design of the row/column reader module 104 is to read all the matrix elements belonging to a row or column efficiently, whereas that of the matrix reader module 100 is to read all matrix elements of the entire matrix or the entire list of matrix elements efficiently.

The matrix ALU module 108 then multiplies $B_{k,j}$ with all the corresponding $A_{i,k}$ elements to produce the partial products $P_{i,j,k}=A_{i,k}*B_{k,j}$. The matrix ALU module 108 sends the resulting partial products to the matrix communication module 124, which forwards the partial products $P_{i,j,k}$ to the appropriate node processors that are to compute and contain the corresponding resulting matrix element $C_{i,j}$. In addition, the matrix communication module 124 sends arriving partial products to the matrix writer module 106, which generates the memory write requests to the memory interface module 120. These received partial products are stored upon arrival, for example, in coordinate format.

In a subsequent phase of the matrix-matrix multiplication operation, after receiving all of its partial products, each node processor sorts the partial products that that node processor received. The sorting process serves at least two purposes: to find and accumulate all partial products ($P_{i,j,k}$ for all k) that belong to the same matrix element $C_{i,j}$; and to organize the resulting matrix elements $C_{i,j}$ according to the indices values so that the matrix elements $C_{i,j}$ can be stored in a desired orderly format.

Specifically, the matrix reader module 100-1 reads the partial products $P_{i,j,k}$ and sends them to the sorter module 110. If a merge sorting algorithm is implemented, the received partial products are divided into multiple sub-lists. The sorter module 110 specifies from which sub-list the next partial product is read, and sorts the partial products based on the combined matrix indices i and j. Depending on the matrix representation, one of the matrix indices serves as the MSBs of the combined index and the other of the matrix indices serves as the LSBs of the combined index. For example, a column-based representation can use the column index j as the MSBs and the row index i as the LSBs. The sorter module 110 sorts the combined column and row index bits. The sorter module 110 sends the sorted partial products to the matrix writer module 106 for writing back into the memory 118 in the new sorted order. This process repeats until all partial products are fully sorted. In the last sorting pass, the sorter module 110 sends the fully sorted data to the matrix ALU module 108.

The matrix ALU module 108 performs accumulation on the successive sorted partial products with identical indices. Such accumulation can occur during each pass of the sorting process when multiple passes occur. The matrix ALU module 108 then sends the fully sorted and accumulated partial products to the matrix writer module 106 for writing to the memory 118 as the result matrix elements $C_{i,j}$.

Before each phase of the matrix-matrix multiplication operation, the node controller module 122 prepares those specialized accelerator modules involved in the computational phase. For example, before the initial phase of matrix-matrix multiplication operation, the matrix reader module 100 receives the memory locations where the matrix B elements are stored, and the matrix writer module 106 receives the memory locations where the received matrix B elements are to be stored as an unsorted matrix element list. The matrix communication module 124 receives the matrix B element mapping information to determine the destination node processor for each matrix element sent. Information that prepares the accelerator modules for a subsequent phase can be loaded into the specialized accelerator modules during the current phase to reduce the time spent loading the control information. The node controller module 122 sets up and manages the other subsequent computational phases in a similar way.

When matrices A and B are represented in row-based matrix-storage format, such as CSR, similar matrix multiplication processes are followed except for some minor differences. In this case, matrix elements $A_{i,k}$ are sent to the corresponding processors containing matrix elements $B_{k,j}$ instead of matrix elements $B_{k,j}$ being sent to the node processors containing matrix elements $A_{i,k}$. The partial products are generated in a similar way by multiplying each matrix element $A_{i,k}$ with column matrix elements $B_{k,j}$, and sending the resulting partial products to the corresponding node processors that are to process the matrix element $C_{i,j}$. The sort and accumulation processes are done in a similar manner as in the column-based matrix-storage format.

Other arithmetic or logical operations can be done instead of multiply and add operations for implementing graph algorithms using sparse matrix operations. FIG. 14 shows an example of an 'in-place' matrix operations involving two matrices 170-1 (matrix A) and 170-2 (matrix B), that produces a results matrix 170-3 (matrix C). The in-place operations include dot add (C=A.+B), dot subtract (C=A.-B), dot multiply (C=A.*B), and dot divide (C=A./B) operations. Such operations are deemed 'in-place' because each operation can be performed without any communication between the node processors, provided the mappings are identical for the three matrices A, B, and C, with all computations for the matrix operation occurring locally within the node processor.

If the mapping is different among the matrices, however, the matrix elements $A_{i,j}$ and matrix elements $B_{i,j}$ can be sent to appropriate node processors containing the corresponding matrix elements $C_{i,j}$ before the operation begins. The sending and receiving of the matrix A elements and matrix B elements are similar to the sending of the matrix elements in the initial redistribution phase of the matrix-matrix multiplication operation described in connection with FIG. 13. Here, the redistribution takes place one matrix at a time. The received matrix A or matrix B elements are stored in the memory 118 during the redistribution phase. Subsequently, the stored matrix elements are sorted and stored in a desired row or column-based format before the operation. The sorting operation occurs similarly to the sorting of the partial products in the matrix multiplication operation, except there is no accumulation. After redistribution and sorting, the matrix A and matrix B have the same mapping as the C matrix. After the matrices A, B, and C have the same mapping, the 'in-place' operations, namely, the dot-add, dot-subtract, dot-multiply, or dot-divide operation, can proceed. FIG. 13 shows a dot add operation as a representative example that produces in-place operations.

The matrix A and matrix B elements are 2-way merge sorted with appropriate add, multiply, or divide operations being performed on sorted results when the indexes are identical between the matrix A elements and matrix B elements. The matrix A elements and matrix B elements can be pre-sorted using combined matrix indices, depending on the matrix representation as previously described. During the merge sort phase, one matrix reader module 100-1 reads the matrix A elements and another matrix reader module 100-2 reads the matrix B elements, each set of matrix elements being read in sequential order. The matrix elements are sent to the sorter module 110. The sorter module 110 merge sorts the incoming matrix A elements and matrix B elements according to their combined index and sends the result to the matrix ALU module 108.

The matrix ALU module 108 then performs an accumulation operation on successive matrix elements only if their combined indices are identical, to produce results matrix C elements. If the combined indices are not identical, the matrix elements pass through the matrix ALU module 108 without modification to produce the matrix C elements. The resulting matrix C elements are sent to the matrix writer module 106, which writes matrix C elements into the memory 118 of the node processor 22 in the desired matrix-storage format.

In addition to sparse matrix-matrix multiplication and dot add/subtract/multiply/divide operations, other matrix operations may be needed for solving graph algorithms. These operations can include, but are not limited to, adding or multiplying a constant to the matrix and summing rows or columns of matrices. Adding ($C_{i,j}=A_{i,j}+k$) or multiplying ($C_{i,j}=A_{i,j}*k$) by a constant k can be implemented in a similar way as the dot-add or dot-multiply operations. A difference from the dot-add operation is that the matrix ALU module 108 receives matrix elements from one matrix and a constant rather than matrix elements from two matrices. Addition and multiplication operations can be substituted by arbitrary simple/complex arithmetic or logical operations for performing sparse matrix-based graph algorithms.

Summing of rows or columns can be implemented by first assuring the matrix is stored in a row-based matrix-storage format for row summation and in a column-based matrix-storage format for column summation. The matrix reader module 100-1 reads and sends the matrix elements to the matrix ALU module 108. All the matrix elements within a row or a column arrive at the matrix ALU module 108 as successive matrix elements. The matrix ALU module 108 then sums the successive matrix elements if their row indices (or column indices, depending on whether the operation is a summation of a row or of a column) are identical. The matrix ALU module 108 sends the resulting matrix elements to the matrix writer module 106 for writing into the memory 118. Stored is a one-dimensional sparse vector containing the sums of the rows (or columns). Again, note that the add operation can be substituted by arbitrary simple/complex arithmetic or logical operation for performing sparse matrix-based graph algorithms.

Although designed primarily for sparse matrix operations, the multiprocessor system 20 and node processors 22 can also handle sparse vectors. Sparse vectors are special cases of sparse matrices, having only a single row or a single column. The node processor can thus handle sparse matrix-matrix, matrix-vector, vector-matrix, and vector-vector operations. Dense matrices or vectors are also within the handling capability of the node processor because such matrices or vectors can be represented as sparse matrices or vectors with all or most entries (matrix elements) occupied. The node processor can also handle higher dimensional matrices. For example, a 3-dimensional matrix can be represented with multiple 2-dimensional matrices.

Simulations show that multiprocessor systems comprised of node processors with specialized accelerator module circuits can achieve orders of magnitude higher computational throughput than conventional multiprocessor systems when computing large graph algorithms. Both node processors and conventional processors of the simulations were configured in a 1024-node multiprocessor configuration. Similar processor-implementation technologies were assumed for the node processor and for the conventional processor.

The simulations used an algorithmically generated database having properties similar to real-world graph databases. The simulated graph algorithms included the betweenness centrality computation algorithm. Each multiprocessor system (node processor and conventional processor) ran graph algorithm application programs in sparse matrix algebra format. To solve the graph algorithm, each multiprocessor system first converted the graph algorithm into a sparse matrix algorithm. The multiprocessor system then ran the sparse matrix algorithm. Based on simulations, the multiprocessor system with the node processor architecture provides up to three orders of magnitude higher computational throughput over the conventional multiprocessor system. The power efficiency simulated was also orders of magnitude higher in the node processor. The overall throughput of the node processor depends on the particular database, algorithm, architecture, and implementation.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects. All such forms may be generally referred to herein as a "system." Furthermore, aspects of the present invention may take the form of a computer program product embodied in one or more computer readable storage medium(s) having computer readable program code embodied thereon.

A computer readable storage medium may be any tangible medium that can contain, or store a program for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium include, but are not limited to, the following: a portable computer diskette, a hard disk, a random access memory (RAM), a read-only memory (ROM), an erasable programmable read-only memory (EEPROM, EPROM, Flash memory), an optical fiber, a portable compact disc read-only memory (CD-ROM), an optical storage device, a magnetic storage device, or any suitable combination of the foregoing. Program code embodied on a computer readable storage medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described herein with reference to flowchart illustrations and block diagrams of methods, apparatus (systems), and computer program products in accordance with embodiments of the invention. Each block of the flowchart illustrations and block diagrams, and combinations of blocks in the flowchart illustrations and block diagrams can be implemented by computer program instructions.

Computer program instructions may be provided to a processor of a general purpose computer, special purpose computer, or other programmable data processing apparatus to produce a machine, such that the instructions, which execute via the processor of the computer or other programmable data processing apparatus, create means for implementing the functions, acts, or operations specified in the flowchart and block diagram block. Computer program instructions may also be stored in a computer readable storage medium that can direct a computer, other programmable data processing apparatus, or other devices to function in a particular manner, such that the instructions stored in the computer readable medium produce an article of manufacture including instructions which implement the function, act, or operation specified in the flowchart and block diagram block.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions, acts, or operations specified in the flowchart or diagram block.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of program code, which comprises one or more executable instructions for implementing the specified logical function(s). The functions noted in the blocks may occur out of the order noted in the FIGS. For example, two blocks shown in succession may be executed substantially concurrently, or the blocks may sometimes be executed in the reverse order, depending upon the functionality involved. In addition, each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of performing a matrix operation that operates with first and second sparse matrices to produce a sparse results matrix, the method comprising:
   distributing non-zero matrix elements of the first sparse matrix and non-zero matrix elements of the second sparse matrix among a plurality of node processors, each of the node processors having memory for storing non-zero matrix elements;
   mapping matrix elements of the sparse results matrix across the plurality of node processors;
   receiving, by each node processor from the other node processors, one or more non-zero matrix elements of the first sparse matrix that had been distributed to those other node processors;
   generating, by each node processor, in accordance with the matrix operation, partial results based on the non-zero matrix elements of the first sparse matrix received by that node processor from the other node processors and on the non-zero matrix elements of the second sparse matrix distributed to that node processor;
   receiving, by each node processor from the other node processors, those partial results generated by the other node processors and associated with the matrix elements of the sparse results matrix mapped to that node processor;
   generating, by each node processor, a final value for each matrix element of the sparse results matrix mapped to that node processor based on the partial results generated by that node processor and on the partial results received from the other node processors associated with that matrix element of the sparse results matrix.

2. The method of claim 1, further comprising sorting, by each node processor, the partial results generated by that node processor and received from the other node processors before generating the final value for each matrix element of the sparse results matrix.

3. The method of claim 2, further comprising associating the partial results for each matrix element of the sparse results matrix with matrix indices, and wherein the sorting of the partial results is based on these matrix indices.

4. The method of claim 3, wherein the matrix operation is a sparse matrix-sparse matrix multiplication operation, the generated partial results are partial products, and the generating of the final value for each matrix element of the sparse results matrix includes accumulating partial products that have identical matrix indices.

5. The method of claim 1, wherein the generating of partial results by each node processor includes performing a matrix-element level operation based on the non-zero matrix elements of the first sparse matrix received by that node processor from the other node processors and on the non-zero matrix elements of the second sparse matrix distributed to that node processor.

6. The method of claim 5, wherein the matrix-element level operation includes one of a Boolean operation, a dot add operation, a dot multiply operation, a minimum operation, and a maximum operation.

7. The method of claim 1, wherein one of the first and second sparse matrices is a sparse vector.

8. The method of claim 1, wherein the distributing of non-zero matrix elements of the first sparse matrix and non-zero matrix elements of the second sparse matrix among the plurality of node processors includes approximately balancing a number of non-zero matrix elements of each of the first and second sparse matrices across the plurality of node processors.

9. The method of claim 8, wherein the balancing of the number of non-zero matrix elements of each of the first and second sparse matrices across the plurality of node processors includes arranging the non-zero matrix elements of each of the first and second sparse matrices into segments of approximately equal number of non-zero-matrix elements and distributing an approximately equal number of segments to each node processor.

10. The method of claim 1, wherein the mapping of matrix elements of the sparse results matrix across the plurality of node processors includes balancing a number of partial results generated and final values generated approximately equally among the node processors.

11. The method of claim 1, wherein one of the first and second sparse matrices is in column storage format and the other of the first and second sparse matrices is in row format.

12. The method of claim 1, wherein the distributing of non-zero matrix elements of the second sparse matrix among the plurality of node processors includes:
   partitioning each column of the second sparse matrix that has more non-zero elements than a first threshold number into segments of approximately equal number of non-zero matrix elements, and distributing these segments approximately equally among the node processors;
   rearranging each column of the second sparse matrix that has fewer non-zero matrix elements than the first threshold value and more non-zero matrix elements than a second threshold value into a vector, partitioning the vector into segments, and distributing these segments approximately equally among the node processors; and
   randomly distributing the non-zero elements of each column having fewer non-zero matrix elements than the second threshold value among the node processors.

13. The method of claim 1, wherein the distributing of non-zero matrix elements of the second sparse matrix among the plurality of node processors includes:
   classifying the plurality of columns of the second sparse matrix into a plurality of classes based on density of non-zero matrix elements in each of the columns;
   associating each class of columns with a distribution scheme; and
   distributing the non-zero matrix elements of the columns in each class based on the distribution scheme associated with that class.

14. The method of claim 1, wherein the second sparse matrix is stored in a compressed column storage format, and further comprising: acquiring an entire column of non-zero matrix elements of the second sparse matrix that is stored in one of the node processors by acquiring column start address information for the column.

15. The method of claim 1, wherein the second sparse matrix is stored in a compressed row storage format, and further comprising: acquiring an entire row of non-zero matrix elements of the second sparse matrix that is stored in one of the node processors by acquiring row start address information for the row.

16. The method of claim 1, wherein the distributing of non-zero matrix elements of the second sparse matrix among the plurality of node processors includes:
   rearranging the non-zero matrix elements of the second sparse matrix into a vector, partitioning the vector into segments, and distributing these segments approximately equally among the node processors.

17. The method of claim 16, wherein the rearranging of the non-zero matrix elements of the second sparse matrix into a vector is a column-based rearrangement.

18. The method of claim 16, wherein the rearranging of the non-zero matrix elements of the second sparse matrix into a vector is a row-based rearrangement.

19. A multiprocessor system for performing sparse matrix operations, comprising:
a communications network; and
a plurality of node processors in communication with the communications network, the plurality of node processors operating concurrently to perform a matrix operation that operates with first and second sparse matrices to produce a sparse results matrix, each node processor comprising,
memory to store the non-zero matrix elements of the first sparse matrix and the non-zero matrix elements of the second sparse matrix distributed to that node processor and to store matrix elements of the sparse results matrix mapped to that node processor;
means for receiving, over the communications network from the other node processors, one or more non-zero matrix elements of the first sparse matrix that had been distributed to those other node processors; and
an arithmetic logic unit to generate, in accordance with the matrix operation, partial results based on the non-zero matrix elements of the first sparse matrix received by that node processor from the other node processors and on the non-zero matrix elements of the second matrix distributed to that node processor;
wherein the receiving means receives, over the communications network from the other node processors, the partial results generated by the other node processors and associated with the matrix elements of the sparse results matrix mapped to that node processor; and
wherein the arithmetic logic unit generates a final value for each matrix element of the sparse results matrix mapped to that node processor based on the partial results generated by that node processor and on the partial results received from the other node processors associated with that matrix element of the sparse results matrix.

20. The multiprocessor system of claim 19, wherein each node processor further comprises a sorter module to sort the partial results generated by that node processor and received from the other node processors before the arithmetic logic unit generates the final value for each matrix element of the sparse results matrix.

21. The multiprocessor system of claim 20, wherein the sorter module sorts the partial results based on matrix indices of the partial results.

22. The multiprocessor system of claim 21, wherein the matrix operation is a sparse matrix-sparse matrix multiplication operation, the generated partial results are partial products, and arithmetic logic unit generates of the final value for each matrix element of the sparse results matrix by accumulating partial products that have identical matrix indices.

23. The multiprocessor system of claim 19, wherein the arithmetic logic unit of each node processor generates partial results by performing a matrix-element level operation based on the non-zero matrix elements of the first sparse matrix received by that node processor from the other node processors and on the non-zero matrix elements of the second sparse matrix distributed to that node processor.

24. The multiprocessor system of claim 23, wherein the matrix-element level operation includes one of a Boolean operation, a dot add operation, a dot multiply operation, a minimum operation, and a maximum operation.

25. The multiprocessor system of claim 19, wherein one of the first and second sparse matrices is a sparse vector.

26. The multiprocessor system of claim 19, further comprising one or more master processors in communication with the communication network, the one or more master processors distributing the non-zero matrix elements of the first sparse matrix and the non-zero matrix elements of the second sparse matrix among the plurality of node processors in such a manner as to approximately balance a number of non-zero matrix elements of each of the first and second sparse matrices across the plurality of node processors.

27. The multiprocessor system of claim 26, wherein the one or more master processors balance the number of non-zero matrix elements of the second sparse matrix approximately equally across the plurality of node processors by arranging the non-zero matrix elements of the second sparse matrix into segments of approximately equal number of non-zero-matrix elements and distributing an approximately equal number of segments to each node processor.

28. The multiprocessor system of claim 26, wherein the one or more master processors map the matrix elements of the sparse results matrix across the plurality of node processors in a manner that balances a number of partial results generated and final values generated approximately equally among the node processors.

29. The multiprocessor system of claim 26, wherein the one or more master processors distribute non-zero matrix elements of the second sparse matrix among the plurality of node processors by:
partitioning each column of the second sparse matrix that has more non-zero elements than a first threshold number into segments of approximately equal number of non-zero matrix elements, and distributing these segments approximately equally among the node processors;
rearranging each column of the second sparse matrix that has fewer non-zero matrix elements than the first threshold value and more non-zero matrix elements than a second threshold value into a vector, partitioning the vector into segments, and distributing these segments approximately equally among the node processors; and
randomly distributing the non-zero elements of each column having fewer non-zero matrix elements than the second threshold value among the node processors.

30. The multiprocessor system of claim 26, wherein the one or more master processors distribute non-zero matrix elements of the second sparse matrix among the plurality of node processors by:
classifying the plurality of columns of the second sparse matrix into a plurality of classes based on density of non-zero matrix elements in each of the columns;
associating each class of columns with a distribution scheme; and
distributing the non-zero matrix elements of the columns in each class based on the distribution scheme associated with that class.

31. The multiprocessor system of claim 26, wherein the second sparse matrix is stored in a compressed column storage format, and wherein a given node processor acquires an entire column of non-zero matrix elements of the second sparse matrix that is stored in that node processor by acquiring column start address information for the column.

32. The multiprocessor system of claim 26, wherein the second sparse matrix is stored in a compressed row storage format, and wherein a given node processor acquires an entire row of non-zero matrix elements of the second sparse matrix that is stored in that node processor by acquiring row start address information for the row.

33. The multiprocessor system of claim 26, wherein the master processor distributes non-zero matrix elements of the second sparse matrix among the plurality of node processors by:

rearranging the non-zero matrix elements of the second sparse matrix into a vector, partitioning the vector into segments, and distributing these segments approximately equally among the node processors.

34. The multiprocessor system of claim 33, wherein the rearranging of the non-zero matrix elements of the second sparse matrix into a vector is a column-based rearrangement.

35. The multiprocessor system of claim 33, wherein the rearranging of the non-zero matrix elements of the second sparse matrix into a vector is a row-based rearrangement.

36. The multiprocessor system of claim 26, wherein one or more of the plurality of node processors operates as the one or more master processors.

37. The multiprocessor system of claim 19, wherein one of the first and second sparse matrices is in column storage format and the other of the first and second sparse matrices is in row format.

\* \* \* \* \*